(12) United States Patent
Gauthier et al.

(10) Patent No.: US 9,871,245 B2
(45) Date of Patent: Jan. 16, 2018

(54) PROCESS FOR PREPARING CRYSTALLINE ELECTRODE MATERIALS AND MATERIALS OBTAINED THEREFROM

(71) Applicants: JOHNSON MATTHEY PUBLIC LIMITED COMPANY, London (GB); Université de Montréal, Montréal (CA); LA CORPORATION DE L'ECOLE POLYTECHNIQUE DE MONTREAL, Montréal (CA)

(72) Inventors: Michel Gauthier, La Prairie (CA); Dean MacNeil, Ottawa (CA); Joseph Wontcheu, Laval (CA); Patrice Chartrand, Montréal (CA); Guoxian Liang, St-Hyacinthe (CA)

(73) Assignees: Johnson Matthey Public Limited Company, London (GB); Universite de Montreal, Montreal, Quebec (CA); La Corporation de L'Ecole Polytechnique de Montreal, Montreal, Quebec (CA)

( * ) Notice: Subject to any disclaimer, the term of this patent is extended or adjusted under 35 U.S.C. 154(b) by 303 days.

(21) Appl. No.: 14/399,233

(22) PCT Filed: May 28, 2013

(86) PCT No.: PCT/CA2013/000516
§ 371 (c)(1),
(2) Date: Nov. 6, 2014

(87) PCT Pub. No.: WO2013/177671
PCT Pub. Date: Dec. 5, 2013

(65) Prior Publication Data
US 2015/0118561 A1    Apr. 30, 2015

Related U.S. Application Data

(60) Provisional application No. 61/652,463, filed on May 29, 2012.

(51) Int. Cl.
*H01M 4/136* (2010.01)
*H01M 4/1397* (2010.01)
(Continued)

(52) U.S. Cl.
CPC .......... *H01M 4/136* (2013.01); *C01B 25/45* (2013.01); *C01B 25/461* (2013.01);
(Continued)

(58) Field of Classification Search
CPC .. H01M 4/0454; H01M 4/136; H01M 4/1397; C01B 25/461
(Continued)

(56) References Cited

U.S. PATENT DOCUMENTS 5,871,866 A    2/1999  Barker et al.
5,910,382 A    6/1999  Goodenough
(Continued)

FOREIGN PATENT DOCUMENTS

CA    2510880    1/2007
JP    201177030    11/2012
(Continued)

OTHER PUBLICATIONS

Extended European search report, dated Jan. 8, 2016; Application No. 13796533.1.
(Continued)

*Primary Examiner* — Basia A Ridley
*Assistant Examiner* — James M Erwin
(74) *Attorney, Agent, or Firm* — Baker & Hostetler LLP

(57) ABSTRACT

There is provided a process for preparing a crystalline electrode material, the process comprising: providing a liquid bath comprising the electrode material in a melted state; and introducing a precursor of the electrode material into the liquid bath, wherein the electrode material comprises lithium, a metal and phosphate. There is also provided (Continued)

a crystalline electrode material, comprising lithium substituted by less than 0.1 atomic of Na or K; Fe and/or Mn, substituted by less than 0.1 atomic ratio of: (a) Mg, Ca, Al and B, (b) Nb, Zr, Mo, V and Cr, (c) Fe(III), or (d) any combinations thereof; and $PO_4$, substituted by less than 20% atomic weight of an oxyanion selected from $SO_4$, $SiO_4$, $BO_4$, $P_2O_7$, and any combinations thereof, the material being in the form of particles having a non-carbon and non-olivine phase on at least a portion of the surface thereof.

20 Claims, 11 Drawing Sheets

(51) Int. Cl.
*H01M 4/04* (2006.01)
*C01B 25/46* (2006.01)
*C01B 25/45* (2006.01)
*H01M 4/58* (2010.01)
*H01M 4/36* (2006.01)

(52) U.S. Cl.
CPC ....... *H01M 4/0454* (2013.01); *H01M 4/1397* (2013.01); *H01M 4/366* (2013.01); *H01M 4/5825* (2013.01); *C01P 2006/40* (2013.01)

(58) Field of Classification Search
USPC ........................................................ 429/221
See application file for complete search history.

(56) References Cited

U.S. PATENT DOCUMENTS

| | | | |
|---|---|---|---|
| 6,391,493 B1 | 5/2002 | Goodenough | |
| 6,514,640 B1 | 2/2003 | Armand | |
| 6,528,033 B1 | 3/2003 | Barker | |
| 6,855,273 B2 | 2/2005 | Ravet | |
| 6,962,666 B2 | 11/2005 | Ravet | |
| 7,029,795 B2 | 4/2006 | Li | |
| 7,101,521 B2 | 9/2006 | Hosoya | |
| 7,271,883 B2 | 9/2007 | Newell | |
| 7,344,659 B2 | 3/2008 | Ravet | |
| 7,457,018 B2 | 11/2008 | Armand | |
| 7,534,408 B2 | 5/2009 | Gauthier | |
| 7,601,318 B2 | 10/2009 | Armand | |
| 8,097,362 B2 | 1/2012 | Isono | |
| 8,168,150 B2 | 5/2012 | Hemmer | |
| 8,668,842 B2 | 3/2014 | Liang | |
| 2003/0124423 A1 | 7/2003 | Sasaki et al. | |
| 2003/0232000 A1 | 12/2003 | Lucas et al. | |
| 2004/0111873 A1 | 6/2004 | Okawa | |
| 2010/0065787 A1 | 3/2010 | Armand | |
| 2010/0310936 A1 | 12/2010 | Ohira | |
| 2010/0323245 A1 | 12/2010 | Liang | |
| 2011/0062380 A1* | 3/2011 | Gauthier | C01B 25/37 252/182.1 |
| 2012/0070708 A1 | 3/2012 | Ohira | |

FOREIGN PATENT DOCUMENTS

| | | |
|---|---|---|
| WO | 2005-062404 | 7/2005 |
| WO | 2008-102270 | 8/2008 |

OTHER PUBLICATIONS

Cooper, Alfred R., "Analysis of the Continuous Melting of Glass," CONF-840745-3, Department of Metallurgy and Materials Science, Case Western Reserve University, Cleveland, Ohio, Published Jan. 1, 1984.

Auchet, Olivier, "First-Principles Simplified Modelling of Glass Furnaces Combustion Chambers," Institut National Polytechnique de Lorraine, Vandoeuvre-les-Nancy, France, 2005 IFAC.

\* cited by examiner

US 9,871,245 B2

PROCESS FOR PREPARING CRYSTALLINE ELECTRODE MATERIALS AND MATERIALS OBTAINED THEREFROM

CROSS-REFERENCE TO RELATED APPLICATION

This application claims the benefit of U.S. Provisional Application 61/652,463, filed May 29, 2012, the contents of which are herein incorporated by reference in their entirety.

TECHNICAL FIELD

This application relates generally to a process for preparing crystalline electrode materials and to materials obtained therefrom.

BACKGROUND

Various practical processed have been previously suggested for preparing crystalline electrode materials that are useful for making lithium-ion reversible electrodes for battery applications. For example, WO 2005/062404 describes a process that includes heating precursors of the electrode material to obtain a melt and cooling the melt in order to induce solidification thereof and obtain the crystalline electrode material. The industrial implementation of this process remains unsatisfactory since the process is a batch process that requires a full thermal cycle, thereby increasing cost and/or reducing productivity.

SUMMARY

In one non-limiting broad aspect, the present invention relates to a process for preparing a crystalline electrode material having an olivine structure. The process comprises providing a liquid bath comprising the electrode material in a melted state; and introducing a precursor of the electrode material into the liquid bath. The electrode material comprises lithium, a metal and phosphate.

In another non-limiting broad aspect, the present invention relates to a crystalline electrode material, having an olivine structure, the material comprising lithium substituted by less than 0.1 atomic ratio relative to lithium of Na or K; a metal selected from Fe, Mn, and a mixture thereof, substituted by less than 0.1 atomic ratio relative to the metal of an atom selected from the group consisting of: (a) Mg, Ca, Al and B, (b) Nb, Zr, Mo, V and Cr, (c) Fe(III), and (d) any combinations thereof; and $PO_4$, substituted by less than 20% atomic weight of a non-metal oxyanion selected from $SO_4$, $SiO_4$, $BO_4$, $P_2O_7$, and any combinations thereof, wherein the material is in the form of particles, the particles having on at least a portion of the surface thereof a non-carbon and non-olivine phase.

In another non-limiting broad aspect, the present invention relates to an apparatus for preparing a crystalline electrode material, comprising a chamber for holding a liquid bath comprising the electrode material in a melted state, said electrode material comprising lithium, a metal and phosphate; a feeding device configured for feeding a precursor of the electrode material into the liquid bath; a solidification zone in communication with said chamber for inducing solidification of a portion of the liquid bath introduced into the solidification zone so as to obtain a solidified electrode material; and a heater for maintaining the electrode material within the liquid bath in said melted state.

These and other aspects and features of the present invention will now become apparent to those of ordinary skill in the art upon review of the following brief description of drawings and detailed description of embodiments.

BRIEF DESCRIPTION OF DRAWINGS

A detailed description of specific embodiments of the present invention is provided herein below, by way of example only, with reference to the accompanying drawings.

80.002°—Step: 0.010°—Step time: 90.1 s—Time started: 12 s—2-Theta: 15.000°—Theta: 7.500°—Chi: 0.00°—P Operations: Smooth 0.099|Y scale Add—1000. The figure also shows a non-limiting illustrative XRD assay of at 25° C. result for the compound obtained in Example 4b after the second thermal step in presence of an excess of $LiPO_3$ (B). 2Th/Th locked—Start: 15.000°—End: 80.002°—Step: 0.010°—Step time: 90.1 s—Time started: Time started: 12 s—2-Theta: 15.000°—Theta: 7.500°—Chi: 0.00°. The figure also shows a non-limiting illustrative XRD standard pattern at 25° C. for substantially pure $LiMnPO_4$ (C). Y: 491.22%—d×by: 1. WL: 1.78897—Orthorhombic—a 10.43100—b 6.09470—c 4.73660—alpha 90.000—beta 90.000—gamma 90.000—Primitive—P; and for manganosite $MnO_2$ (D), Y: 58.49%—d×by: 1. —WL: 1.78897—a 4.43540.

Figure 8A:
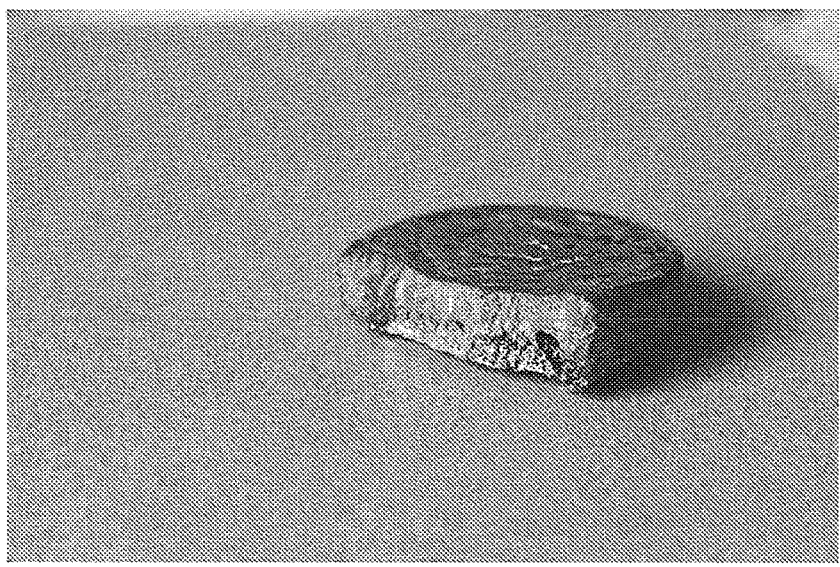
Figure 8B:
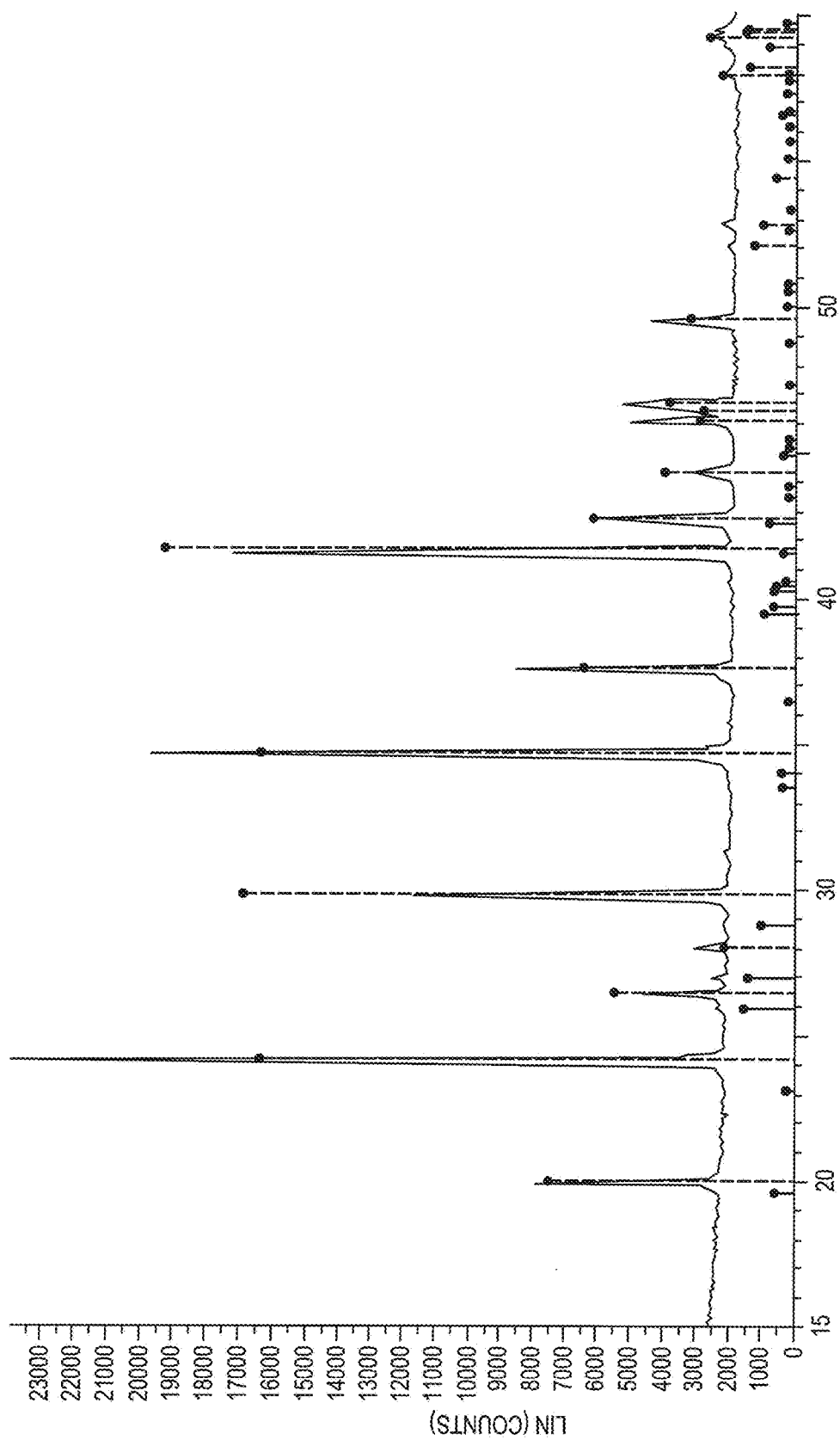

FIG. 8(A) shows a material obtained after solidification of a portion of the liquid bath in Example 5a. The material has 96.8% purity. FIG. 8(B) shows a non-limiting illustrative XRD assay at 25° C. result for the compounds obtained in Example 5. The figure also shows a non-limiting illustrative XRD standard pattern for substantially pure $LiFePO_4$ (vertical dotted lines). Y: 80.16%—d×by: 1. —WL: 1.78897—Orthorhombic—a 10.32900—b 6.00650—c 4.69080—alpha 90.000—beta 90.000—gamma 90.000—Primitive—Pnma (62). The figure also shows a non-limiting illustrative XRD standard pattern for $Li_3PO_4$ (vertical hard lines). Y: 5.64%—d×by 1. —WL: 1.78897—Orthorhombic—a 6.12000—b 10.53000—c 4.93000—alpha 90.000—beta 90.000—Primitive—Pnmb (62)—4—3.

Figure 9A:
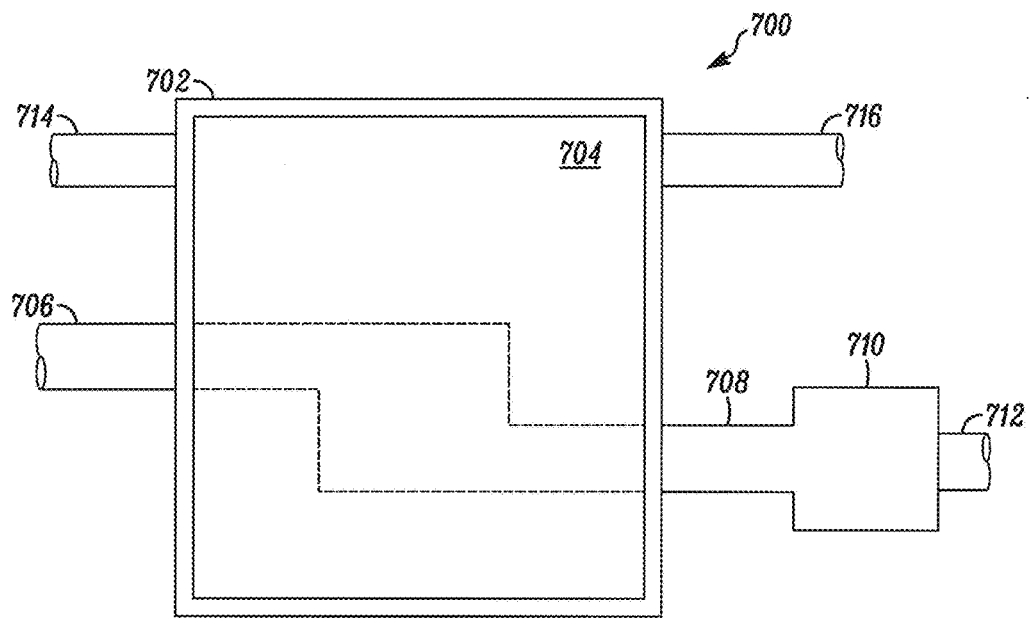
Figure 9B:
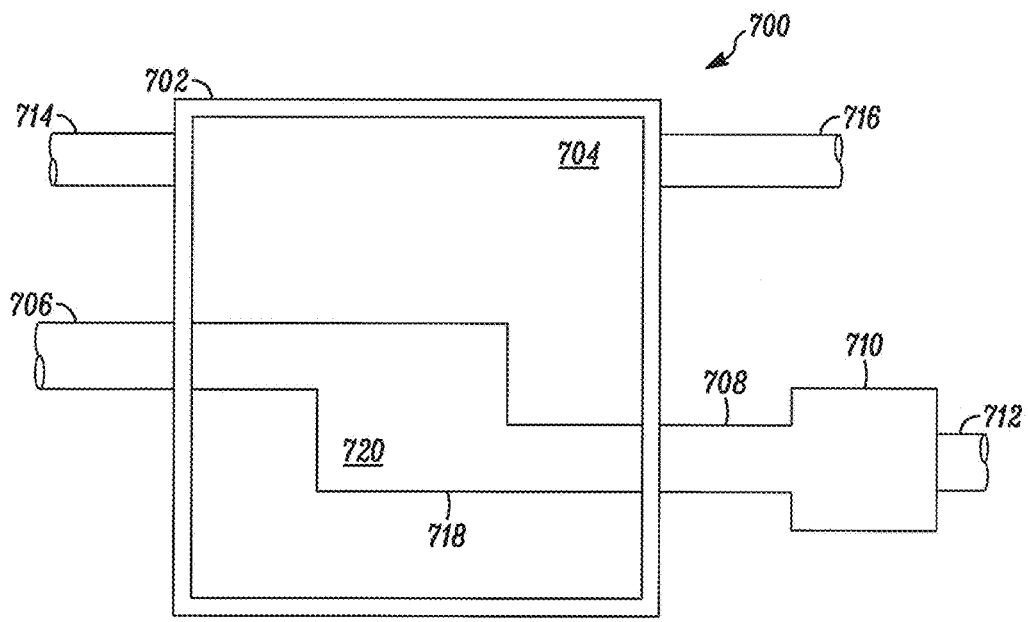

FIGS. 9A and 9B show an apparatus in accordance with a first specific example of implementation of the present invention.

Figure 10:
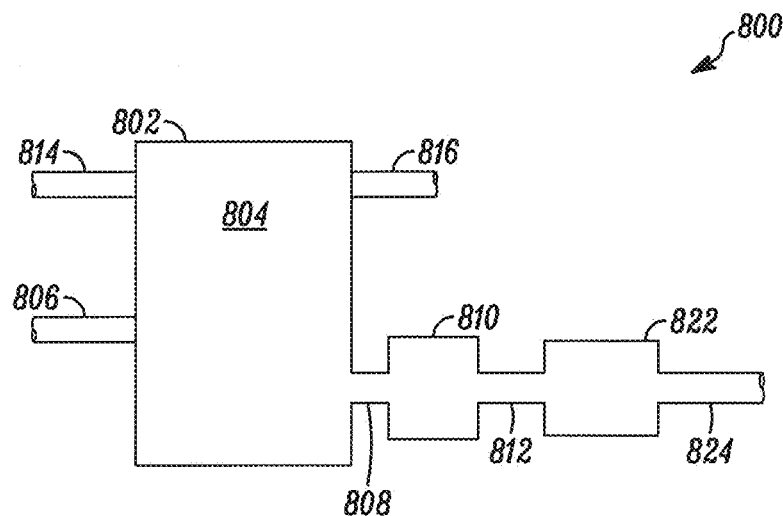

FIG. 10 shows an apparatus in accordance with a second specific example of implementation of the present invention.

Figure 11:
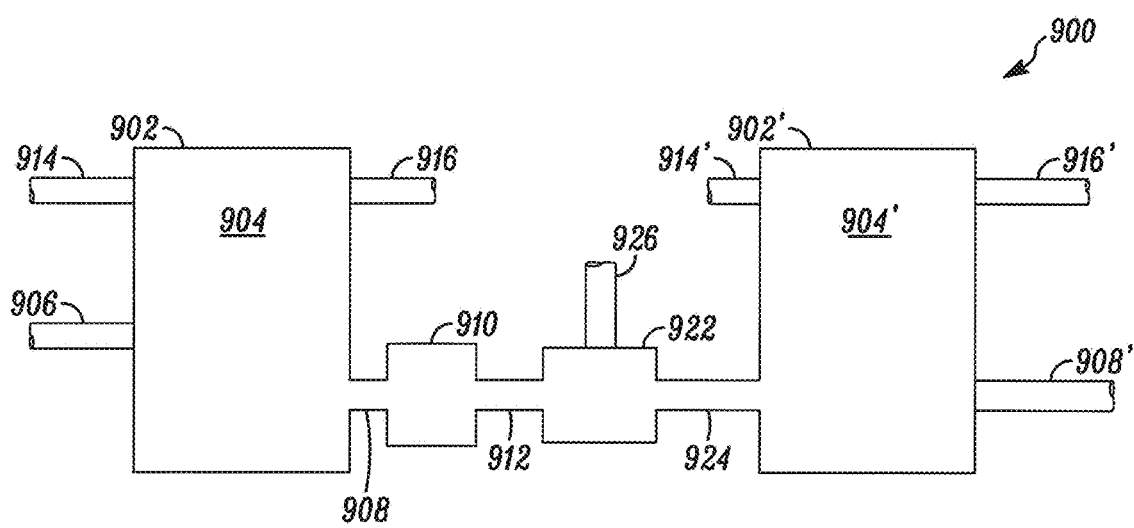

FIG. 11 shows an apparatus in accordance with a third specific example of implementation of the present invention.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

The present inventors propose a process for preparing a crystalline electrode material comprising lithium, a metal and phosphate. Crystalline electrode materials comprising lithium, a metal and phosphate are useful for making lithium-ion reversible electrodes for battery applications and are known in the art. See, for example, but without being limited thereto: WO 2009/096255, WO 2010/134579, JP 2011/77030, WO 2002/027824, WO 2002/027823, and WO 2011/072397.

In one non-limiting aspect, the proposed process comprises providing a liquid bath comprising the electrode material in a melted state and introducing a precursor of the electrode material into the liquid bath.

Advantageously, the proposed process allows one to directly introduce the precursor into the liquid bath at a relatively high rate, thereby generally reducing overall reaction time and/or increasing productivity relative to a batch process having a full thermal cycle (i.e., a cycle that includes an incremental temperature rise).

Also advantageously, introduction of the precursor directly into the liquid bath may, alternatively or additionally, avoid or minimize the formation of side products which may form during the incremental temperature rise that occurs in a batch process having a full thermal cycle.

Also advantageously, introduction of the precursor directly into the liquid bath may allow one to use coarse natural minerals and/or crudely mixed precursors, since the liquid bath will relatively rapidly bring into equilibrium the melted elements in order to obtain the electrode material. For example, the industrial use of less pure precursors, e.g., natural mineral iron oxides, can reduce cost.

In general, and without any limitation, the process can be used to prepare most of the electrode materials described in U.S. Pat. No. 5,910,382, U.S. Pat. No. 6,514,640, U.S. Pat. No. 6,391,493, EP 0 931 361, EP 1 339 119, WO 2003/069701, WO 2005/062404 and the like.

In one non-limiting embodiment, the electrode material further comprises less than 0.1, or less than 0.05, or less than 0.01 atomic ratio relative to lithium of Na or K. Alternatively or additionally, the electrode material further comprises less than 0.1, or less than 0.05, or less than 0.01 atomic ratio (relative to iron and/or manganese) of a substituent selected from the group consisting of (a) Mg, Ca, Al and B, (b) Nb, Zr, Mo, V and Cr, (c) Fe(III), and (d) any combinations thereof. Alternatively or additionally, the electrode material further comprises less than 20%, or less than 15%, or less than 10%, or less than 5% atomic weight (relative to phosphate) of a phosphate substituent selected the group consisting of $SO_4$, $SiO_4$, $BO_4$, $P_2O_7$, and any combinations thereof.

In one non-limiting embodiment, the oxygen may be substituted by less than 35% atomic weight, of a fluoride ion, as may be found in nature in minerals (e.g. fluorapatite) and living organisms.

In a non-limiting embodiment, the process can be used to prepare a crystalline electrode material having a binary composition of nominal formula $Li(Fe_{1-x}Mn_x)PO_4$ where $0 \leq x \leq 1$, or in the case where MnO is substituted by CaO or FeO by MgO, a crystalline electrode material having a ternary or quaternary composition, such as those that can be found in natural minerals as observed by Ni et al, 'Triphylite-lithiophilite series in China' Yanshi Kuangwuxue ZaZhi (1989), 8(2) 144-55.

In a non-limiting embodiment, the process can be used to prepare a crystalline electrode material comprising particles having the nominal formula described previously and having on at least a portion of the surface thereof a non-powdery adherent carbon coating.

A precursor for preparing crystalline electrode materials that are useful for making lithium-ion reversible electrodes for battery applications is also known in the art. Non-limiting examples of such precursor are described in the following.

In one non-limiting embodiment, the precursor of the electrode material comprises a single or a plurality of source compounds. In cases where there is a plurality of source compounds, the compounds in the plurality of source compounds can be introduced individually or in combination into the liquid bath.

In one non-limiting embodiment, the precursor comprises a mixture of chemicals selected to react chemically in order to obtain the desired electrode material.

In one non-limiting embodiment, the precursor is selected from the group consisting of an already synthesized electrode material, a natural occurring source compound for the electrode material, a chemical reactant that is a source for an element of the electrode material, and any combinations thereof.

In one non-limiting embodiment, the precursor comprises a lithium source selected from the group consisting of lithium oxide, lithium hydroxide, lithium carbonate, $Li_3PO_4$ and/or $LiPO3$, $LiH_2PO_4$, $LiNaHPO_4$, $LiKHPO_4$, $Li_2HPO_4$, lithium ortho-, meta- or polysilicates, lithium sulfate, lithium oxalate, lithium acetate, and any mixtures thereof. The person skilled in the art will be able to select a suitable lithium source without undue effort.

In one non-limiting embodiment, the precursor comprises a lithium source as described previously and a source for a lithium substituent selected from the group consisting of sodium oxide, sodium hydroxide, potassium hydroxide, sodium carbonate, potassium carbonate, $Na_3PO_4$, $K_3PO_4$, $NaH_2PO_4$, $KH_2PO_4$, sodium or potassium ortho-, meta- or polysilicates, sodium sulfate, potassium sulfate, sodium oxalate, potassium oxalate, sodium acetate, potassium acetate, and any mixtures thereof. The person skilled in the art will be able to select a suitable source for a lithium substituent without undue effort.

In one non-limiting embodiment, the precursor comprises a metal source selected from the group consisting of iron, iron(III) oxide or magnetite, trivalent iron phosphate, lithium iron hydroxyphosphate or trivalent iron nitrate, ferrous phosphate, hydrated or nonhydrated, vivianite $Fe_3(PO_4)_2$, iron acetate $(CH_3COO)_2Fe$, iron sulfate $(FeSO_4)$, iron oxalate, iron(III) nitrate, iron(II) nitrate, $FeCl_3$, $FeCl_2$, FeO, ammonium iron phosphate $(NH_4FePO_4)$, $Fe_2P_2O_7$, ferrocene, and any mixtures thereof; manganese, MnO, $MnO_2$, manganese acetate, manganese oxalate, Mn(III) acetylacetonate, Mn(II) acetylacetonate, Mn(II) chloride, $MnCO_3$, manganese sulfate, manganese nitrate, manganese phosphate, manganocene, and any mixtures thereof; iron and manganese phosphates or pyrophosphates; and any mixtures thereof.

In one non-limiting embodiment, the metal source comprises $Fe^{3+}$, or $Fe^{+2}$, or a $Fe^{+2}/Fe^{+3}$ mixture, or a $Fe^{\circ}/Fe^{+3}$ mixture, or any combinations thereof. For example, it is possible to use an iron-comprising compound in which both iron in oxidation state +2 and +3 are present, for example but without being limited thereto, $Fe_3O_4$. It is also possible to use a mixture of different iron-comprising compounds comprising a compound in which iron has the oxidation state +3 and another compound in which iron has the oxidation state +2. It is also possible to use a mixture of different iron-comprising compounds comprising a compound in which iron has the oxidation state +3 and another compound in which iron is metallic iron.

In one non-limiting embodiment, the metal source is an iron-comprising compound in which iron has the oxidation state +3 selected from the group consisting of iron(II,III)-oxide, iron(III)-oxide, iron(III)-oxide hydroxide, or iron (III)-hydroxide, for example $Fe_3O_4$, alpha-$Fe_2O_3$, gamma-$Fe_2O_3$, alpha-FeOOH, beta-FeOOH, gamma-FeOOH, $Fe(OH)_3$ and any mixtures thereof.

In one non-limiting embodiment, the metal source is a natural iron mineral such as hematite ($Fe^{+3}$) or magnetite ($Fe^{+2}$ and $Fe^{+3}$). In such a case, the mineral concentrate (~95%) and the other precursors can be used in a coarse form, <200 microns.

In one non-limiting embodiment, the precursor comprises a natural occurring source compound for the metal, where the metal is iron or manganese. Preferably the natural occurring source is an oxide containing magnetite or hematite.

The person skilled in the art will be able to select a suitable metal source without undue effort.

In one non-limiting embodiment, the precursor comprises a metal source as described previously and a source of a metal substituent selected from the group consisting of a source of Mg, Ca, Al and B, Nb, Zr, Mo, V, Cr, Fe(III), and any combinations thereof.

In one non-limiting embodiment, the source of a metal substituent is selected from the group consisting of zinc acetate, zinc chloride, zinc acetylacetonate, zinc nitrate, zinc sulfate, zinc stearate, calcium carbonate, calcium hydroxide, calcium acetate, $CaSO_4$, and any mixtures thereof The person skilled in the art will be able to select a suitable source of a metal substituent without undue effort.

In one non-limiting embodiment, the precursor comprises a phosphate source selected from the group consisting of a phosphorus oxide, a phosphate, a polyphosphate, a pyrophosphate in salt, ammonium and acidic forms thereof, and any combinations thereof, natural phosphate mineral such as apatites. The person skilled in the art will be able to select a suitable phosphate source without undue effort.

In one non-limiting embodiment, the precursor comprises a phosphate source as described previously and a source of a phosphate substituent selected from the group consisting of organosilicon, silicon alkoxides, tetraethyl orthosilicate, nanosized $SiO_2$, $Li_2SiO_3$, $Li_4SiO_4$, $SO_4$ sources, $BO_3$ sources, and any mixtures thereof. The person skilled in the art will be able to select a suitable source of a phosphate substituent without undue effort.

In one non-limiting embodiment, the precursor further comprises a single or a plurality of doping element source(s) selected for example from $MoO_3$, oxide, sulfate or nitrate of Ni, oxide, sulfate or nitrate of Co, $Cr(NO_3)_3$, $Cr_2O_3$, $CrPO_4$, and the like. The person skilled in the art will be able to select a suitable doping element source without undue effort.

In one non-limiting embodiment, when the desired electrode material is $LiFePO_4$, the precursors may be selected from iron, iron oxides, phosphate minerals and commodity lithium or phosphate chemicals such as: $Li_2CO_3$, LiOH, $P_2O_5$, $H_3PO_4$, ammonium or lithium hydrogenated phosphates.

In one non-limiting embodiment, the precursor of the electrode material is characterized as substantially not generating gas release within the liquid bath. For example, such gas release may represent reaction gases (e.g. $CO_2$ from degradation of $Li_2CO_3$), dehydration gases (e.g., water from dehydration of $FePO_4.2H_2O$), and the like. In other words, such precursor should substantially not generate liquid projection or foaming in the liquid bath.

Advantageously, the use of a precursor characterized as substantially not generating gas release within the liquid bath allows one to continuously or semi-continuously feed, at a relatively high rate, the precursor into the liquid bath.

For example, one may use a precursor which naturally substantially does not generate gas release within the liquid bath, or one may use small amounts of a precursor such that any gas release will substantially not generate liquid projection or foaming in the liquid bath, or one may use a precursor which has been treated prior to introduction into the liquid bath such that the precursor substantially does not generate gas release within the liquid bath. For example, one may submit a precursor to a thermal treatment so as to initiate a reaction that releases gas prior to introduction into the liquid bath, for example release of $CO_2$ from degradation of $Li_2CO_3$, release of water from dehydration of $FePO_4.2H_2O$, and the like.

In one non-limiting embodiment, in the specific case where the electrode material comprises Fe and/or Mn and where the oxyanion comprises $PO_4$, a first non-limiting example of a precursor characterized as substantially not generating gas release within the liquid bath is one that comprises $LiPO_3$. This precursor is in its crystalline or vitreous state and is a single source of Li and P. In such specific case, it becomes possible to make, for example, $LiFePO_4$ or $LiMnPO_4$ as exemplified by the following possible reactions:

$$LiPO_3 + MnO \rightarrow LiMnPO_4$$

$$3LiPO_3 + Fe° + Fe_2O_3 \rightarrow LiFePO_4.$$

The melting point of $LiPO_3$ is about 656° C. whereas the melting point of $LiFePO_4$ is about 970° C. and $LiMnPO_4$ is about 984° C.

$LiPO_3$ may be obtained via several routes. For example, one of skill may obtain $LiPO_3$ by performing a controlled thermal step of $LiH_2PO_4$; or of mono-ammonium or di-ammonium phosphate and $Li_2CO_3$ or LiOH; or of $H_3PO_4$ and LiOH or $Li_2CO_3$; and the like.

In another non-limiting embodiment, in the specific case where the electrode material comprises Fe and/or Mn and where the oxyanion comprises $PO_4$, a second non-limiting example of a precursor characterized as substantially not generating gas release within the liquid bath is one that comprises $Fe_3(PO_4)_2$ and/or $Mn_3(PO_4)_2$. This precursor is a single source of Fe/Mn and P. In such specific case, it becomes possible to make, for example, $LiFePO_4$ or $LiMnPO_4$ or $LiMnFePO_4$ as exemplified by the following possible reactions:

$$Fe_3(PO_4)_2 + Li_3PO_4 \rightarrow 3LiFePO_4$$

$$Mn_3(PO_4)_2 + Li_3PO_4 \rightarrow 3LiMnPO_4$$

$$xFe_3(PO_4)_2 + (1-x)Mn_3(PO_4)_2 + Li_3PO_4 \rightarrow 3LiFe_xMn_{1-x}PO_4.$$

$Fe_3(PO_4)_2$ and/or $Mn_3(PO_4)_2$ may be obtained via several routes. For example, one of skill may obtain $Fe_3(PO_4)_2$ and/or $Mn_3(PO_4)_2$ by performing a controlled thermal step of $Fe_3(PO_4)_2 \cdot 8H_2O$ and/or its Mn equivalent under a non-oxidizing atmosphere to evaporate the water.

In another non-limiting embodiment, in the specific case where the herein described electrode material comprises Fe and where the oxyanion comprises $PO_4$, a third non-limiting example of a precursor characterized as substantially not generating gas release within the liquid bath is one that comprises $Fe_2P_2O_7$. This precursor is a single source of Fe and P. In such specific case, it becomes possible to make, for example, $LiFePO_4$ as exemplified by the following possible reaction:

$$Fe_2P_2O_7 + Li_2O \rightarrow 2LiFePO_4$$

Alternatively, $Li_2CO_3$ or LiOH can be used instead of $Li_2O$ and reacted with $Fe_2P_2O_7$ in a solid-state thermal process to make $LiFePO_4$. The solid state process may be as the one described in WO 2002/27824 and WO 2002/27823. The $LiFePO_4$ is then introduced in the liquid bath and is characterized as substantially not generating gas release within the liquid bath.

In another non-limiting embodiment, one may use a precursor comprising a Li—$PO_4$ composition obtained by a process comprising addition of $Li_3PO_4$ and $NH_4H_2PO_4$ in the right stoichiometry into a liquid bath comprising $LiPO_3$ in the melted state. Advantageously, the use of such Li—$PO_4$ composition in the process allows one to prepare a material comprising Li—$PO_4$ rich phases in addition to the crystalline olivine phase, where the Li—$PO_4$ rich phase composition is controlled by the ratio of $Li_3PO_4$ to $LiPO_3$ used, the thermal treatment conditions, the cooling conditions, or any combinations thereof.

The person skilled in the art will be able to select a suitable precursor and select, if required, a technique for ensuring that the precursor is characterized as substantially not generating gas release within the liquid bath, without undue effort.

It is to be noted that in cases where one makes use of substituent chemicals, the amount of eventual gas released in the liquid bath from the substituent chemicals will determine whether treatment of the substituent chemicals is required to avoid disrupting the continuous or semi-continuous characteristic of the process. The person skilled in the art will be able to determine whether such treatment is required without undue effort.

In non-limiting embodiment, the process further comprises withdrawing a portion of the liquid bath and inducing solidification of the portion so as to obtain a solidified electrode material. The withdrawing step may be configured so as to withdraw liquid from the liquid bath in a substantially continuous or semi-continuous manner. This can be done, for example, by directly retrieving liquid from the liquid bath, or in the specific case where the liquid bath comprises a liquid phase comprising the electrode material in a melted state and an additional non-miscible liquid metallic phase, this can be done by retrieving liquid from the liquid bath using a glass floating technique known in the glass industry. The person skilled in the art will be able to identify a suitable withdrawing step technique and configure such without undue effort.

In one non-limiting embodiment, the inducing a solidification step comprises a cooling, casting or atomization step. For example, one may use an atomization apparatus (jet atomization, centrifugal, ultrasonic, etc.), a cooling mold or drum, an exposure to air or non oxidizing atmosphere and quenching in water, oil, or both water and oil, and the like. The person skilled in the art will be able to identify a suitable inducing solidification step technique and configure such without undue effort.

In another non-limiting embodiment, the introducing and withdrawing steps are performed concomitantly. Industrial implementation of this embodiment may allow one to continuously operate thereby increasing productivity.

In another non-limiting embodiment, the introducing and withdrawing steps are performed at a respective rate so as to maintain the liquid in the liquid bath at a constant level. Industrial implementation of this embodiment may facilitate the monitoring of the process and/or facilitate temperature homogeneity in the liquid bath.

In one non-limiting embodiment, the liquid bath is maintained at a temperature between the melting temperature of the electrode material and about 300° C. above the melting temperature thereof, preferably between the melting temperature of the electrode material and 150° C. above the melting temperature thereof. The person skilled in the art will be able to identify a suitable temperature without undue effort. The melting temperature of a lithium-containing electrode material and/or the melting temperature of precursors thereof are known in the art or can be identified without undue effort.

In one non-limiting embodiment, the liquid bath is maintained at the above temperature using standard heating means such as, resistive, gas-fired, inductive or other heating means know in electrometallurgy.

In another non-limiting embodiment, the liquid bath is maintained at the above temperature while performing assisted convection. For example, assisted convection makes use for stirring the liquid bath of a mechanical stirrer, gas injection, forced convection by thermal gradient, and the like. The person skilled in the art will be able to perform assisted convection without undue effort.

Assisted convection may be beneficial when using highly viscous precursors, such as, but not limited thereto, polyphosphates, e.g. $LiPO_3$. Assisted convection may also facilitate efficient introduction of substitution ions for the metal or the oxyanion in the electrode material present in the liquid bath. For example, one may introduce metal ions such as those from $M^{+3}$ to $M^{+6}$ ions, or oxyanion ions such as $SO_4^{-2}$, $SiO_4^{-4}$, $BO_3^{-3}$ or other boron or non-metal oxyanion in the liquid bath. In such cases, the solidification step would define the condition of electroneutrality or this condition would rely on the use of multi-substitution of ion of complementary. Assisted convection may also be beneficial when using coarse precursors.

Assisted convection may also facilitate bringing in equilibrium the elements within the liquid in the liquid bath with an additional gas, liquid or solid phase.

In one non-limiting embodiment, the process further includes removing an impurity-containing phase from the solidified lithium-containing electrode material. For example, one may perform a mechanical ablation of the impurity-containing phase.

In another non-limiting embodiment, the process further comprises a pulverization step of the solidified electrode material so as to control the particle size of the solidified material. The pulverization step may be implemented by using any one from the known techniques in the art, such as, but without being limited thereto, crushing, jaw mill or roller mill, jet mill, wet or dry mills, atritors high-energy milling, grinding, atomization, powderization, classifying, and mechanofusion. For example, one of skill may perform a step such that the electrode material is composed of particles as described in U.S. 2010/0323245. For example, one of skill may perform a grinding step at high-energy which is sufficient to obtain particles having a size of less than 1 micron. A device for performing such grinding step may be selected from any bead mills that can reduce the particles size down to the nanometer range, for example but without any limitation, high-energy ball mills, pulverizing mixer mills, planetary ball mills, drum/ball-mills, shaker mills, stirred ball mills, mixer ball mills, vertical and horizontal attritors, and equivalent milling equipments. Particularly, mention may be made of the Ultra APEX™ Mill by Kotobuki Industries Co. Ltd of Japan, High speed Netzsch Zeta™ agitator bead mill by Netzsch of Germany, Hosokawa Alpine AHM™ mill by Hosokawa of Japan, and MicroMedia® P1 & MicroMedia® P2 bead mill by Buehler of Switzerland. Milling parts of the grinding equipment are preferably made of ceramics, or coated with ceramics, for example, but without any limitation, alumina, zirconium silicate, zirconia, yttria or ceria stabilized zirconia, silicium nitride, tungsten carbide or silicium carbide. The person skill in the art is able to identify a device for performing the herein described grinding step or suitable milling parts without undue effort.

In another non-limiting embodiment, the process further comprises adding an organic source of carbon prior to, concomitantly with, or after the pulverization step and performing a thermal step so as to obtain a carbon coating on at least a portion of the surface of the particles. The carbon coating can be present as a more or less uniform deposit and is present at less than 15 wt %, preferably less than 10 wt. %, more preferably less than 5 wt. %, even more preferably close to 2 wt. % where the percentage is with respect to the total weight of the electrode material. In use, the carbon coating may participate in electron exchange. The carbon coating can be deposited, for example, by a thermal step performed on an organic source of carbon as described in U.S. Pat. No. 6,855,273, U.S. Pat. No. 6,962,666, WO 2002/27824 and WO 2002/27823, or modified in order to be performed under low oxygen partial pressure (low $pO_2$). The person skill in the art is able to implement a suitable thermal step for obtaining the carbon coating without undue effort.

In one non-limiting embodiment, the liquid bath is held in a chamber, for example a crucible. The crucible is advantageously made of a material selected from graphite, silicon carbide, clay graphite, zirconia oxide, alumina and silico aluminate, and the like. The person skilled in the art will be able to identify a suitable material without undue effort.

In one non-limiting embodiment, the solidification step or the thermal step performed on the organic source of carbon also allows controlling the composition of the material in the bulk and/or at the surface thereof. For example, one may obtain a solidified material which has a nominal formulation which is different from the nominal formulation of the melted material within the liquid bath. Alternatively or additionally, one may obtain a secondary non-carbon and non-olivine phase located at crystal boundaries between the olivine crystals. See, for example, Journal of the Electrochemical Society, 157 (4), 453-62, 2010.

Secondary non-carbon and non-olivine phase can also be obtained by varying other parameters of the process, for example one may control the stoichiometry and activity of the elements present in the liquid within the liquid bath, the thermal treatment parameters, the solidification step parameters, the composition of the atmosphere which is present during the carbon deposition step, and the like.

For example, one of skill may control the solidification conditions so as to obtain a slow, directional cooling of the material, creating impurity-containing phases localized outside the olivine structure crystals. These impurity-containing phases may later be removed or held in a non-active electrochemical form.

Alternatively, one of skill may control the solidification conditions so as to obtain a rapid cooling or atomization, allowing one to obtain an electrode material having substantially the same nominal formulation as the melted electrode material within the liquid in the liquid bath.

Alternatively, one of skill may control the solidification conditions so as to obtain a slow, directional cooling and solidification of the material, perform the herein described pulverization step, and perform a thermal step, for example the thermal step for obtaining the carbon deposit in presence of low $pO_2$ (pyrolysis). Such combination of steps allows one to precipitate or segregate one or more impurity-containing phases and thereby obtain particles having a plurality of bulk and/or surface modifications. For example, one may obtain an electrode material comprising particles, where the particles have a non-carbon and non-olivine phase present on at least a portion of the surface of the particles, where the particles have a particle size distribution comprising a plurality of mean particle sizes, and the plurality of mean particle sizes having a heterogeneous non-carbon and non-olivine phase content.

Without being bound by any theory, it is believed that during the implementation of the process, Si, Al, Zr or a combination thereof present in the crucible material may be incorporated into the liquid bath and eventually incorporated into the non-carbon and non-olivine phase.

The person skill in the art is able to implement suitable steps for obtaining the non-carbon non-olivine phase, (and if desired, of heterogeneous content), without undue effort.

In one non-limiting embodiment, the organic source of carbon is a compound which is in the liquid state or in the gas state, a compound which can be used in the form of a solution in liquid solvent, or a compound which changes to the liquid or gas state during its thermal decomposition or transformation, including to CO gas that can form C and $CO_2$, so as to result in the herein described more or less continuous uniform carbon coating. For example, the organic source of carbon is selected from liquid, solid or gaseous hydrocarbons and their derivatives (in particular polycyclic aromatic entities, such as tar or pitch), perylene and its derivatives, polyhydric compounds (for example, sugars and carbohydrates, and their derivatives), polymers, cellulose, starch and their esters and ethers, fatty acid salts (for example stearic, oleic acid or lithium stearate), fatty acid esters, fatty alcohol esters, alkoxylated alcohols, alkoxylated amines, fatty alcohol sulfate or phosphate esters, imidazolium and quaternary ammonium salts, ethylene oxide/propylene oxide copolymer, ethylene oxide/butylene oxide copolymer and their mixtures. Mention may be made, as examples of polymers, of polyolefins, polybutadienes, polyvinyl alcohol, condensation products of phenols (including those obtained from reaction with aldehydes), polymers derived from furfuryl alcohol, from styrene, from divinylbenzene, from naphthalene, from perylene, from acrylonitrile and from vinyl acetate. A non-limiting example is Unithox™ 550 ethoxylate (Baker Hughes). Unithox™ ethoxylates are nonionic emulsifiers and wetting agents with high molecular weights and melt points. These Baker Petrolite ethoxylated products are produced from Unilin™ alcohols which are fully saturated, long chain, linear, $C_{20}$ to $C_{50}$, synthetic alcohols. The person skilled in the art will be able to select a suitable organic source of carbon without undue effort.

In one non-limiting embodiment, the liquid bath is in the presence of carbon or an organic source of carbon in an amount sufficient to prevent oxidation of the oxidation state of at least one metal in the precursors without full reduction to an elemental state.

In one non-limiting embodiment, the liquid bath comprises a second non-miscible liquid, gas or solid phase which can participate in dissolving, reacting or fixing the activity of one or more elements in the liquid bath and therefore control the chemical composition of the resulting electrode material, or so as to participate in trapping impurities from the precursors. Advantageously, the gas phase may be used to control oxygen partial pressure, $pO_2$.

In one non-limiting embodiment, the second phase is solid and comprises silicate or calcium-based scories or slags or non soluble carbon powder phases. The solid phase can be used or is obtained, for example, when one wishes to use a mineral or mineral compound as a precursor. For example, one may use a solid $Ca_5(PO_4)_3F$ natural apatite phase as a source of F substitution element for $O^{-2}$ in $XO_4$ or as a source of $PO_4$, one may use a solid $CaSO_4$ phase as a source of Ca substitution element for Mn or Fe, and the like. Similarly, natural magnetite mineral can be used as a Fe precursor generating progressively a solid phase containing mainly silico-aluminate solid slags, making possible the use of a low grade and low cost Fe precursor as well as help control the Fe activity. For example, in the specific case of $LiPO_3$ or a composition comprising $LiPO_3$—$Li_3PO_4$, the use of an excess to the 1-1-1 $LiMPO_4$ stoichiometry will usually generate an additional solid phase, the composition of which may vary depending on the initial $LiPO_3$ and/or $Li_3PO_4$ relative amounts introduced in the liquid bath.

In one non-limiting embodiment, the additional non-miscible liquid in the liquid bath may comprise Sn—Cu, Sn, Sn alloy, Ti or tin-based compositions.

Without being bound to any particular theory, it is believed that reactions of metals (M) with oxygen ($O_2$) to form metal oxides ($M_xO_y$) are generally thermodynamically governed by the following reactions:

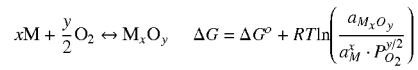

where ΔG is the change of Gibbs energy of the system under real conditions of T, P and compositions, ΔG° is the change of Gibbs energy of the system under standard conditions of T and P with the pure materials, T is the absolute temperature (in K), R is the ideal gas constant (8.31451 J/mol-K), a, are the chemical activities of the metal and of the metal oxide relative to the pure materials, and $P_{O2}$ is the partial pressure of $O_2$. At equilibrium ΔG=0. The standard Gibbs energy of the reaction, ΔG°, is related to the standard enthalpy and entropy of the reaction: ΔG°=ΔH°−TΔS°.

For the Li—Fe—P—O system, the base oxides that can be in equilibrium with the metal (at around 1050° C.) are:

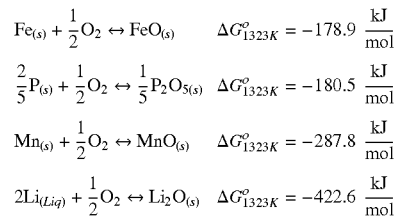

As ΔG° is more negative, then the oxidation tendency of the metal is higher. Lithium is more easily oxidized, iron and phosphorus more easily reduced.

In the specific case of $LiFePO_4$ or $LiMnPO_4$, all metallic elements including phosphorus (Li, Fe, Mn and P) are oxidized. If $LiFePO_4$ and/or $LiMnPO_4$ are added to a metallic element, in an inert atmosphere, that 1) is less prone to oxidation than Li, Fe, Mn and P, and 2) is liquid at a temperature where $LiFePO_4$ and $LiMnPO_4$ are liquids, then it can be expected that this metallic element will not oxidize and will not react with $LiFePO_4$ or $LiMnPO_4$. This metallic element can therefore be used as an inert flux with both of these oxides. To be less prone to oxidation, the standard Gibbs energy of the oxidation reaction should be more positive (per mole of O as a basis of calculation) relative to that one of the more positive among Li, Fe, Mn and P—which is Fe with a

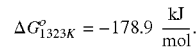

all redox reaction with Fe will favor the oxidation of Fe and the reduction of the metallic element:

Non-limiting examples of metallic elements that meet the above criteria are Cu and Sn. Their standard Gibbs energies of oxidation at 1050° C. are given by:

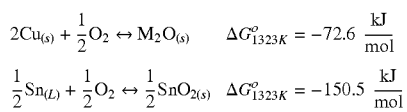

These two values are more positive that the oxidation of $Fe^0$ to $Fe^{2+}$. Liquid Cu and liquid Sn are substantially completely miscible, and their respective melting point temperature is at 1083° C. and 231° C. Fe, Mn, P and Li being slightly soluble in molten Cu—Sn alloys, one can thus find an alloy of Cu and Sn that has a composition where the liquid's temperature lies between these two limiting values.

As such, liquid state Cu, Sn or Cu—Sn alloys can be used to equilibrate with the herein described liquid comprising the electrode material in a melted state in order to: 1) use the alloys as a medium for synthesis of electrode material from different reactants and 2) use the alloys as a way of fine-tuning the stoichiometry/composition of the resulting electrode material.

For example, one prepares a closed furnace with an inert atmosphere and a carbon crucible containing 1 mole of Li, 1 mole of Fe, 1 mole of P, 2 moles of $O_2$, 4 moles of Cu and 1 mole of Sn. In theory, the stable reaction products at 1050° C. should be 1 mole of liquid $LiFePO_4$ and 5 moles of a Cu—Sn liquid alloy (80 mol. % Cu and 20 mol. % Sn). The amount of Li, Fe and P in the Cu—Sn liquid alloys should be very small (i.e., less than 0.1 mol %), and the amounts of $Cu_2O$ and $SnO_2$ should be negligible.

For example, one prepares a closed furnace with an inert atmosphere (argon) and a carbon crucible containing $LiPO_3$ and molten Cu-20% Sn alloy saturated in Fe at 1050° C. By adding a stoichiometric amount of $Fe_2O_3$ (based on the addition of 0 from $Fe_2O_3$) we obtained $LiPO_3+⅓ Fe_{(dissolved\ in\ Cu—Sn)}+⅓\ Fe_2O_3 \rightarrow LiFePO_4$. Other $Li_2O$—$P_2O_5$—$Fe_xO$ source could be used to obtain the $LiFePO_4$ stoichiometry. In this example, the excess of Fe in the liquid Cu—Sn alloy favors the desired $Fe^{2+}$ oxidation state in the $LiFePO_4$ phase. The identical experiment was repeated except for the use of a Mn source to obtain $LiMnPO_4$.

By varying the Fe and Mn content of the Cu—Sn alloy, the following reaction is forced to the right or to the left to target a proper Fe/Mn ratio in a mixture of $LiFePO_4$ and $LiMnPO_4$:

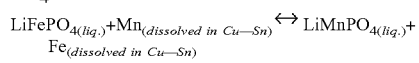

The high density of the Cu—Sn alloy makes it a relatively good medium for phase separation with $LiMPO_4$. A high Sn alloy can be used for solidification of a dense flat $LiMPO_4$ product if desired.

In a non-limiting embodiment, the process can be used to prepare an electrode material comprising particles having the nominal formula described previously and having on at least a portion of the surface thereof a non-carbon and non-olivine phase.

The non-carbon and non-olivine phase comprises unreacted precursor(s); intermediate reaction compound(s); an impurity produced when maintaining the electrode material in a melted state; compounds of nominal formulation Li-M, or M-α, or Li—P—O, or any combinations thereof; compounds comprising Si, Al, Zr, or any combinations thereof at a concentration of less than 5 wt. % relative to the crystalline electrode material weight, preferably less than 2 wt. %, but in any event at more than 500 ppm relative to the crystalline electrode material global composition; or any combinations thereof.

The non-carbon and non-olivine phase may be obtained using a suitable precursor, such as $LiPO_3$ or $LiPO_3$—$Li_3PO_4$ or by controlling the thermal step parameters during deposition of the carbon deposit described herein.

In a non-limiting embodiment, the process can be used to prepare an electrode material comprising particles having the nominal formula described previously and having on at least a portion of the surface thereof a non-powdery adherent carbon coating and a non-carbon and non-olivine phase.

In a non-limiting embodiment, the non-carbon and non-olivine phase is located outside the electrode material olivine structure and outside the carbon deposit structure.

Advantageously, the non-carbon and non-olivine phase may entrap and/or concentrate impurities outside the olivine crystal structure.

Advantageously, the non-carbon and non-olivine phase together with the carbon deposit may participate in ion and electron exchange.

It should be understood that the stoichiometry of each element in the electrode material can deviate from the formal 1-1-1-4 (Li-M-P—O) ratio, e.g., by up to ±0.2 atomic ratio, especially in the melted material within the liquid bath.

In one non-limiting embodiment, the process further comprises a step of adding to the electrode material surface and/or in the bulk, additives, such as, but without any limitation: carbon particles, carbon fibers and nanofibers, carbon nanotubes, graphene, vapor growth conductive fiber (VGCF), metallic oxides, and any mixtures thereof. Those additives can be in any form, including spherical (granular) form, flaky form, fibrous form and the like. The person skilled in the art is able to select a suitable additive without undue effort.

In one non-limiting embodiment, at least a portion of the process can be performed under a non-oxidizing atmosphere such as, without any limitation, nitrogen, argon, and/or helium or oxygen poor combustion gases.

In one non-limiting embodiment, at least a portion of the process is performed under a partially reductive or reductive atmosphere which can participate in the reduction and/or prevent oxidation of the oxidation state of at least one metal in the precursors without full reduction to an elemental state.

In one non-limiting embodiment, the reductive atmosphere is, but without being limited thereto, an externally applied reductive atmosphere, a reductive atmosphere derived from the degradation of a source compound, or a reductive atmosphere derived from the synthesis reaction.

In one non-limiting embodiment, the above externally applied reductive atmosphere comprises a gas such as, but without being limited thereto, CO, $H_2$, $NH_3$, HC including natural gas, and any combinations thereof, which can participate in the reduction or prevent oxidation of the oxidation state of at least one metal in the precursors without full reduction to an elemental state and where HC refers to any hydrocarbon or carbonaceous product in gas or vapor form. The externally applied reductive atmosphere can also comprise a gas such as, but without being limited thereto, $CO_2$, $N_2$, argon, helium, nitrogen or other inert gases.

In one non-limiting embodiment, the above reductive atmosphere is derived from the combustion of natural gas or fuels used during heating.

In one non-limiting embodiment, the above reductive atmosphere derived from the degradation of a source compound is, but without being limited thereto, a reductive atmosphere which is produced when the source compound is degraded or is transformed during a thermal step. The source compound can be a reducing agent source which is degraded or is transformed during a thermal step and produces a reductive atmosphere which participates in the reduction or prevents the oxidation of the oxidation state of at least one metal in the precursors without full reduction to an elemental state. In one non-limiting embodiment, this reductive atmosphere comprises CO, $CO/CO_2$, $H_2$, or any combinations thereof.

In one non-limiting embodiment, the above reductive atmosphere derived from the synthesis reaction is, but without being limited thereto, a reductive atmosphere that is produced during the herein described thermal step, and which participates in the reduction or prevents the oxidation of the oxidation state of at least one metal in the precursors without full reduction to an elemental state. In one non-limiting embodiment, this reductive atmosphere comprises CO, $CO/CO_2$, $H_2$ or any combinations thereof.

The person skilled in the art will be able to select a suitable atmosphere without undue effort.

In another non-limiting broad aspect, the present inventors also propose a crystalline electrode material, having an olivine structure, the material comprising lithium substituted by less than 0.1, or less than 0.05, or less than 0.01 atomic ratio relative to lithium of Na or K; a metal selected from Fe, Mn, and a mixture thereof, substituted by less than 0.1, or less than 0.05, or less than 0.01 atomic ratio relative to the metal of an atom selected from the group consisting of: (a) Mg, Ca, Al and B, (b) Nb, Zr, Mo, V and Cr, (c) Fe(III), and (d) any combinations thereof; and $PO_4$, substituted by less than 20%, or less than 15%, or less than 10%, or less than 5% atomic weight of a non-metal oxyanion selected from $SO_4$, $SiO_4$, $BO_4$, $P_2O_7$, and any combinations thereof, wherein the material is in the form of particles, the particles having on at least a portion of the surface thereof a non-carbon and non-olivine phase.

In one non-limiting embodiment, the electrode material has a non-powdery adherent carbon coating on at least a portion of the surface of the particles, the coating being present at less than 15 wt %, preferably less than 10 wt. %, more preferably less than 5 wt. %, even more preferably close to 2 wt. % where the percentage is with respect to the total weight of the electrode material.

In one non-limiting embodiment, the non-carbon and non-olivine phase comprises unreacted precursor(s); intermediate reaction compound(s); an impurity produced when maintaining the electrode material in a melted state; compounds of nominal formulation Li-M, or M-P, or Li—P—O, or any combinations thereof; compounds comprising Si, Al, Zr, or any combinations thereof at a concentration of less than 5 wt. % relative to the crystalline electrode material weight, preferably less than 2 wt. %, but in any event at more than 500 ppm relative to the crystalline electrode material global composition; or any combinations thereof.

Advantageously, the non-carbon and non-olivine phase together with the carbon deposit may participate in ion and electron exchange, or the non-carbon and non-olivine phase may entrap and/or concentrate impurities outside the olivine crystal structure.

In a non-limiting embodiment, the non-carbon and non-olivine phase is located outside the electrode material olivine structure and outside the carbon deposit structure.

In one non-limiting embodiment, the non-carbon and non-olivine phase is an ion conductive phase.

In one non-limiting embodiment, the non-carbon and non-olivine phase can be present at less than 15 wt. %, or less than 10 wt. %, or less than 5 wt. % relative to the weight of the electrode material.

In one non-limiting embodiment, the herein described material has particles that have a non-carbon and non-olivine phase present on at least a portion of the surface of the particles, where the particles have a particle size distribution comprising a plurality of mean particle sizes, and where the plurality of mean particle sizes have a heterogeneous non-carbon and non-olivine phase content.

In one non-limiting embodiment, the electrode material comprises individual particles and agglomerates thereof, where the size of the individual particles is between about 10 nm and about 3 μm and/or the size of agglomerates is between about 100 nm and about 30 μm.

In one non-limiting embodiment, the electrode material comprises individual particles and agglomerates thereof, where the $D_{50}$ size of the agglomerates is between about 500 nm and about 10 μm. In another non-limiting embodiment, the $D_{90}$ size of the agglomerates is less than 30 μm.

In one non-limiting embodiment, the herein described material has a particle size distribution comprising micron size (>1 micron), or nano size (<1 micron) particles, or any mixtures thereof.

In one non-limiting embodiment, the herein described agglomerates can be obtained by: (1) partial sintering of the individual particles during a thermal step, or (2) bridging the individual particles with carbon, where the carbon is a non-powdery adherent carbon coating, or (3) bridging the individual particles with the herein described non-carbon and non-olivine phase, or (4) any combinations thereof. The person skilled in the art is able to select a suitable process for obtaining agglomerates without undue effort.

Specific Physical Implementation

In another non-limiting broad aspect, the present inventors propose an apparatus for preparing the crystalline lithium-containing electrode material.

In one non-limiting embodiment, the apparatus for preparing the crystalline electrode material comprises a chamber for holding the liquid bath comprising the electrode material in the melted state. The apparatus also comprises a feeding device configured for feeding the precursor of the electrode material into the liquid bath; and a solidification zone configured for inducing solidification of a liquid portion of the liquid bath introduced into the solidification zone so as to obtain a solidified electrode material. The apparatus comprises a heater for maintaining the electrode material within the liquid bath in the melted state. The heater comprises resistive, gas-fired, inductive, arc electrical heating, or other heating means know in electrometallurgy.

In one non-limiting embodiment, the chamber for holding the liquid bath is defined by an enclosure (for example a crucible) which is made of a material selected from graphite, silicon carbide, clay graphite, zirconia oxide, alumina and silico aluminate, and the like. The person skilled in the art will be able to identify a suitable material without undue effort.

In a non-limiting example, the feeding device may include any device configured for feeding the precursor of the electrode material into the liquid bath. For example, one may use a feeding screw. In one non-limiting embodiment, the feeding device is configured for heating the precursor of the electrode material contained within the feeding device under a controlled atmosphere. The person skilled in the art will be able to select a suitable feeding device and configure such without undue effort.

In one non-limiting embodiment, the chamber is configured to provide assisted convection. For example, the implementation of assisted convection may make use of means for stirring the liquid bath selected from, but which are not limited thereto, a mechanical stirrer, gas injection, forced convection by thermal gradient, and the like. The person skilled in the art will be able to identify suitable means for implementing assisted convection without undue effort.

In one non-limiting embodiment, the solidification zone comprises a cooling surface, a mold or an atomization zone.

In one non-limiting embodiment, the apparatus further comprises at least one pulverizer for grinding the solidified electrode material so as to obtain particles thereof. The pulverizer is any device which is configured for crushing, jaw milling or roller milling, jet milling, wet or dry milling, atritors high-energy milling, grinding, atomizing, powdering, classifying, and performing mechanofusion. Devices for performing such grinding may be selected from any bead mills that can reduce the particles size down to the nanometer range, for example but without any limitation, high-energy ball mills, pulverizing mixer mills, planetary ball mills, drum/ball-mills, shaker mills, stirred ball mills, mixer ball mills, vertical and horizontal attritors, and equivalent milling equipments. Particularly, mention may be made of the Ultra APEX™ Mill by Kotobuki Industries Co. Ltd of Japan, High speed Netzsch Zeta™ agitator bead mill by Netzsch of Germany, Hosokawa Alpine AHM™ mill by Hosokawa of Japan, and MicroMedia® P1 & MicroMedia® P2 bead mill by Buehler of Switzerland. Milling parts of the grinding equipment are preferably made of ceramics, or coated with ceramics, for example, but without any limitation, alumina, zirconium silicate, zirconia, yttria or ceria stabilized zirconia, silicium nitride, tungsten carbide or silicium carbide. The person skill in the art is able to identify a device or suitable milling parts without undue effort.

In one non-limiting embodiment, the apparatus further comprises a processing zone for depositing, by heating an organic carbon source, a carbon coating on at least a portion of the surface of the particles of the electrode material. The processing zone may include a chamber which is configured for heating under a controlled atmosphere the material and the organic source of carbon so as to obtain the carbon deposit on at least a portion of the surface of the material particles.

In one non-limiting embodiment, the feeding device is configured to feed the precursor in the chamber while liquid from the chamber is being transferred to the solidification zone continuously or semi-continuously.

In one non-limiting embodiment, the feeding device is configured to feed the precursor in the chamber at a rate which matches a rate of transfer of liquid from the chamber to the solidification zone so as to maintain the liquid in the chamber at a generally constant level.

A first non-limiting embodiment of the proposed apparatus 700 is depicted in FIGS. 9A and 9B. The apparatus 700 comprises an enclosure 702 defining a first chamber 704. The apparatus comprises a second chamber 720 for holding the liquid bath, as better depicted in FIG. 9B. The apparatus 700 also comprises a heater for maintaining the electrode material within the liquid bath in a melted state. The chamber 720 is defined by an enclosure 718.

A feeding device 706 is configured to feed a precursor of the electrode material into the second chamber 720 such that the precursor is introduced directly into the liquid bath.

The first chamber 704, if desired, can be in communication with the second chamber 720 such that the same atmosphere can be present in the first and the second chambers.

The apparatus 700 further comprises a solidification zone 710 for inducing solidification of a liquid portion withdrawn from the second chamber 720. The solidification zone comprises a cooling surface, a mold or an atomization zone. An optional withdrawing element 708 is shown on FIGS. 9A and 9B for having the solidification zone 710 in communication with the second chamber 720.

An optional second withdrawing element 712 is shown for withdrawing the solidified lithium-containing electrode material from the solidification zone 710. If desired, input 716 and output 714 can be present in communication with enclosure 702 to feed and withdraw atmosphere, respectively, from the first chamber 704. Optional input and output can also be present in communication with the solidification zone 710 to feed and withdraw atmosphere therefrom.

A second non-limiting embodiment of the proposed apparatus 800 is depicted in FIG. 10. The apparatus 800 comprises an enclosure 802 defining a first chamber 804. The apparatus comprises a second chamber for holding the liquid bath, as better depicted in FIG. 9B under element 720. The apparatus 800 also comprises a heater for maintaining the electrode material within the liquid bath in a melted state.

A feeding device 806 is configured to feed a precursor of the electrode material into the second chamber such that the precursor is introduced directly into the liquid bath.

The first chamber 804, if desired, can be in communication with the second chamber such that the same atmosphere can be present in the first and the second chambers.

The apparatus 800 comprises a solidification zone 810 for inducing solidification of a liquid portion withdrawn from the second chamber. The solidification zone comprises a cooling surface, a mold or an atomization zone. An optional withdrawing element 808 is shown for having the solidification zone 810 in communication with the second chamber.

If desired, input 816 and output 814 can be present in communication with enclosure 802 to feed and withdraw atmosphere from the first chamber 804. Optional input and output can also be present in communication with the solidification zone 810 to feed and withdraw atmosphere therefrom.

The apparatus 800 further comprises a pulveriser 822 for grinding the solidified material so as to control the material particle size. An optional second withdrawing element 824 is shown for having the pulveriser 822 in communication with the solidification zone 810. Optional input and output can also be present on the solidification zone 810 and/or the pulveriser 822 to feed and withdraw atmosphere therefrom.

A third non-limiting embodiment of the proposed apparatus 900 is depicted in FIG. 11. The reactor 900 comprises a first enclosure 902 defining a first chamber 904. The apparatus comprises a second chamber for holding the liquid bath, as better depicted in FIG. 9B under element 720. The apparatus 900 also comprises a heater for maintaining the electrode material within the liquid bath in a melted state.

A feeding device 906 is in communication with the enclosure 902 for feeding a precursor of the electrode material into the liquid bath.

The first chamber 904, if desired, can be in communication with the second chamber such that the same atmosphere can be present in the first and the second chambers.

The apparatus 900 comprises a solidification zone 910 for inducing solidification of a liquid portion withdrawn from the second chamber. The solidification zone comprises a cooling surface, a mold or an atomization zone. An optional withdrawing element 908 is shown for having the solidification zone 910 in communication with the second chamber.

If desired, input 916 and output 914 can be present in communication with enclosure 902 to feed and withdraw atmosphere from the first chamber 904. Optional input and output can also be present in communication with the solidification zone 910 to feed and withdraw atmosphere therefrom.

The apparatus 900 further comprises a pulveriser 922 for grinding the solidified material so as to control the material particle size. An optional second withdrawing element 924 is shown for having the pulveriser 922 in communication with the solidification zone 910. Optional input and output can also be present on the solidification zone 910 and/or the pulveriser 822 to feed and withdraw atmosphere therefrom.

The apparatus 900 further comprises a processing zone defined by a second enclosure 902'. Optionally, the second enclosure 902' may be generally identical to the first enclosure 902 as depicted in FIG. 11. The second enclosure 902' is configured so as to obtain a carbon deposit on particles of the pulverized material.

An optional third withdrawing element 924 is shown for having the pulveriser 922 in communication with the second enclosure 902'.

The second enclosure 902' comprises a heater for heating the organic source of carbon so as to form a carbon coating on at least a portion of the surface of the particles of the electrode material. Input 916' and outputs 914' are in communication with chamber 904' to feed and withdraw atmosphere from chamber 904'.

An optional input 926 is shown in communication with the pulveriser 922 for adding compounds to the particles of the electrode material, for example a stabilizing agent (e.g., as described in EP 2 095 451) and/or an organic source of carbon, prior to, concomitant with, or after performing the pulverization in the pulveriser 922. Optional input and output can be in communication with the solidification zone 910 and/or the pulveriser 922 to feed and withdraw atmosphere therefrom.

While the embodiment depicted in FIGS. 9A, 9B, 10 and 11 showed an apparatus having specific configurations, it will be appreciated that alternative implementations of the concepts of the apparatus presented above may include other configurations.

For example, the feeding device presented previously may be configured so as to have a controlled atmosphere (for example a reducing atmosphere, or a partially reducing atmosphere, or a non-oxidizing atmosphere). The feeding device may also comprise a heater for heating the precursor such that the precursor releases gases prior to introduction into the liquid bath.

In addition, while the examples of apparatus presented previously show a substantially rectangular enclosure, variants of the apparatus may include other shapes, for example, generally cylindrical, and the like. Examples of suitable apparatus include, but are not limited thereto, rotary kilns, push kilns, fluidized beds, belt-driven kilns, and the like. The person skilled in the art will be able to identify a suitable apparatus without undue effort.

In addition, variants of the apparatus may be configured so as to have a partially reducing, a reducing, or an inert atmosphere within the within any of the depicted feeding/withdrawing elements.

In addition, variants of the apparatus may, if desired, be configured to perform assisted convection. For example, assisted convection may make use for stirring the liquid bath of a mechanical stirrer, gas injection, forced convection by thermal gradient, and the like. The person skilled in the art will be able to configure the apparatus to perform assisted convection without undue effort.

In addition, variants of the apparatus may use manual or automatic driving mechanism to operate the withdrawing elements. Further, variants of the reactor may omit one or more of such withdrawing elements, or may have disconnection in between given elements/zone, for example, with reference to FIG. 11 the withdrawing element 912 may have disconnection such that one can withdraw continuously or semi-continuously the electrode material from the solidification zone 910, proceed to further processing of the material, for example remove impurity phases from the electrode material, and thereafter introduce the electrode material into the pulveriser 922.

In addition, while the example of apparatus presented previously depicted input and output elements as elongated conduits, variants of the apparatus may instead have apertures, for example for receiving an external input or output element, or for manually inserting and/or withdrawing compounds into and/or from an enclosure and/or element and/or zone.

In addition, while the example of apparatus presented previously with reference to FIG. 11 shows two enclosures 902 and 902', variants of the apparatus may include three, four, or more enclosures, each enclosure being configured with different parameters, for example a given temperature.

The foregoing is considered as illustrative only of the principles of the invention. Further, since numerous modifications and changes will readily occur to those skilled in the art, it is not desired to limit the invention to the exact examples and embodiments shown and described, and accordingly, all suitable modifications and equivalents may be resorted to, falling within the scope of the invention.

EXAMPLES

Without intent to limit the scope of the invention, exemplary instruments, apparatus, methods and their related results according to embodiments of the present invention are given below.

Example 1

Preparation of $LiPO_3$

Figure 1:
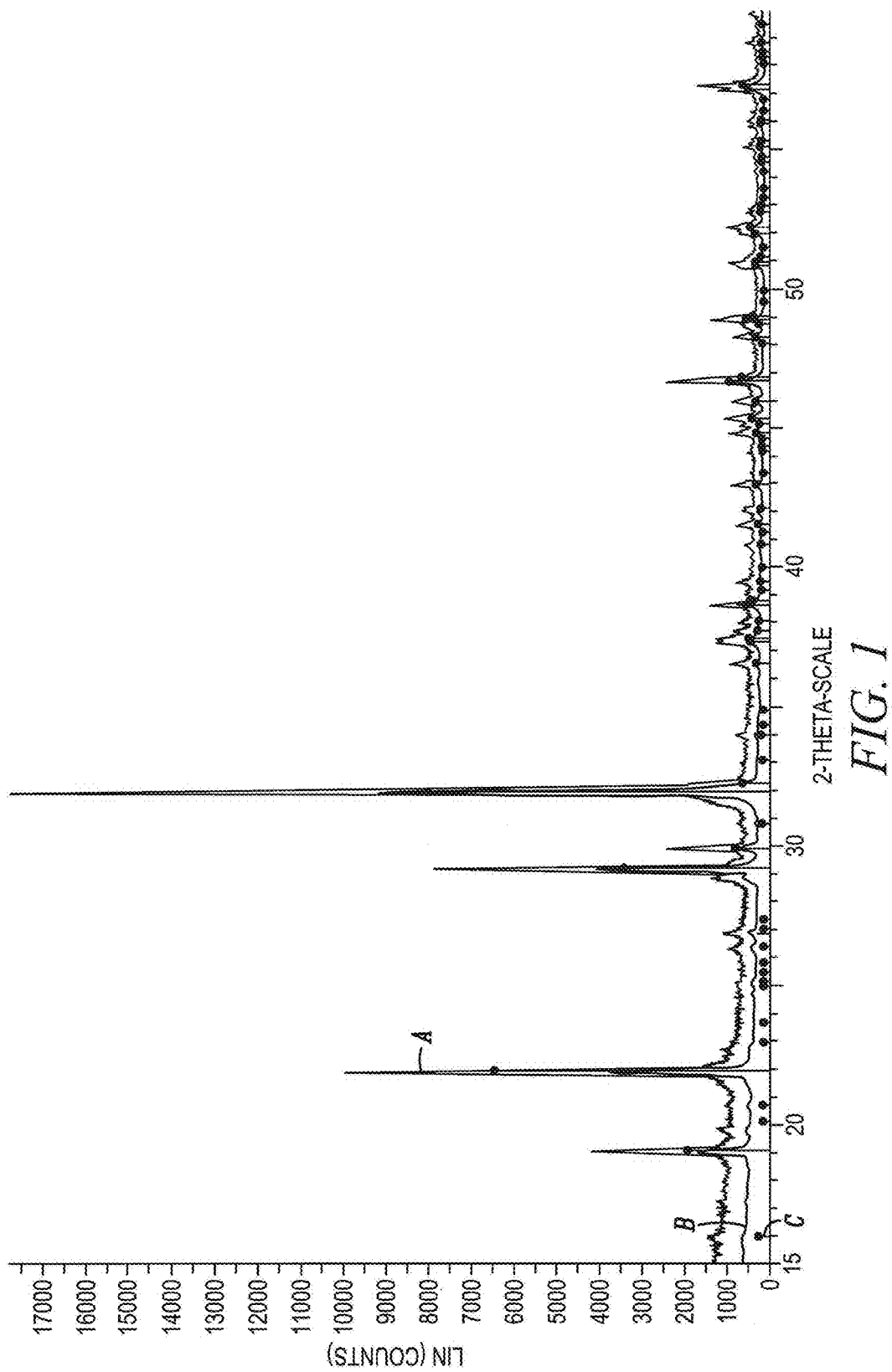
FIG. 1 shows a non-limiting illustrative x-ray diffraction (XRD) assay at 25° C. result for $LiPO_3$ made in Example 1 from $NH_4H_2PO_4+Li_2CO_3$ (A) and $LiPO_3$ made from $LiH_2PO_4$ (B). 2-Theta: 15.000°—Theta: 7.500°—Chi 0.00°. The figure also shows a non-limiting illustrative XRD standard pattern at 25° C. for monoclinic $LiPO_3$ (C). Y:44.36%—dxby: 1,—WL: 1.78897—Monoclinic—a 13.07400—b 5.40680—c 16.45200—alpha 90.000—beta 99.000—Primitive—P2/n (13)—20-114.

Example 1a 28.75 g. of $NH_4H_2PO_4$ (from Aldrich) was mixed with 9.24 g. of $Li_2CO_3$ (99.99% from Limtech) in a mortar. A thermal step was performed on the mixture for 48 hours under air in an open graphite container to 190° C., 350° C. and 450° C. A white crystalline product was obtained. FIG. 1(A) shows the XRD characterization of the product.

Example 1b

A thermal step was performed on 40 g. of $LiH_2PO_4$ (99% from Aldrich Cat. No.: 442682) for 48 hours under air in an open graphite container to 190° C., 350° C. and 450° C. A white crystalline product was obtained. FIG. 1(B) shows the XRD characterization of the product.

Example 1c

The experiments in Example 1a and 1b were reproduced under identical conditions except for the use of two thermal steps 250° C. for 3 hours, followed by a cooling step and a subsequent grinding step at 500° C. for 3 hours. The resulting $LiPO_3$ product also showed the same XRD pattern as in Examples 1a and 1b.

Example 1d $LiPO_3$ was also obtained from a reaction of $Li_2CO_3$ with anhydrous $P_2O_5$. The resulting product was substantially pure $LiPO_3$ when an excess of $P_2O_5$ was used. Without such excess, the reaction resulted in $Li_4P_2O_7$ instead of $LiPO_3$.

Example 1e

The experiment in Example 1a was reproduced under identical conditions except for the use of single thermal step at 650° C. to obtain vitreous $LiPO_3$.

Example 1f

Vitreous $LiPO_3$ was also obtained from a reaction of $Li_3PO_4$ with $NH_4H_2PO_4$ by introducing progressively the reactants with the right stoichiometry into a liquid bath comprising molten $LiPO_3$ and held at 680° C. in a graphite crucible under air.

Example 2

Preparation of $LiFePO_4$ from $LiPO_3$

Example 2a

Figure 2:
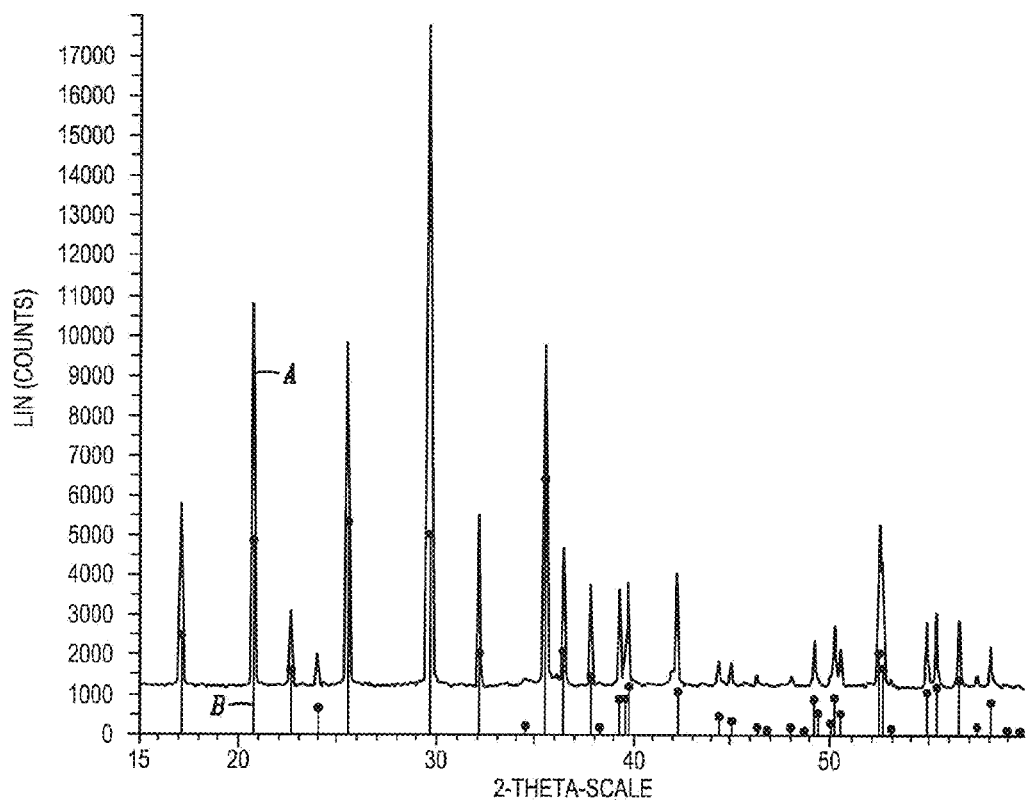
FIG. 2 shows a non-limiting illustrative XRD assay at 25° C. for the product made in Example 2 (A). 2Th/Th locked—start 15.000°—End: 59.977°—Step 0.050°—Step time 6912.6 s. The figure also shows a non-limiting illustrative XRD standard pattern for substantially pure $LiFePO_4$ (B). Y: 35.74%—dxby: 1. —WL: 1.5406—orthorhombic—a 10.33400—b 6.01000—c 4.69300—alpha 90.000—beta 90.0. $R_{exp}$: 1.78, $R_{wp}$: 2.67, $R_p$: 1.83, GOF: 1.20, a(Å)= 10.332 (1), b(Å)=6.002 (1), c(Å)=4.695 (2), V(Å)=291.14 (2).

A thermal step was performed on a mixture of stoichiometric quantities of 8.17 g. $LiPO_3$, 5.06 g. $Fe_2O_3$ (pigment from Bayer) and 1.77 g. $Fe^0$ (QMP Atomet grade 195SP<45 microns) for 1 hour under an inert argon atmosphere in a graphite crucible container held at 1050° C. Substantially no gas was released within the liquid bath. FIG. 2 shows the XRD pattern of the resulting product as being identical to that of substantially pure $LiFePO_4$ (vertical hard lines). The resulting chemical reaction thus corresponds to:

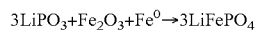

$$3LiPO_3 + Fe_2O_3 + Fe^0 \rightarrow 3LiFePO_4$$

Example 2b

The experiment in Example 2a was reproduced under identical conditions except for the use of an alumina crucible instead of the graphite crucible to produce $LiFePO_4$. Substantially no gas was released within the liquid bath. The resulting product was also substantially pure $LiFePO_4$. This experiment suggests that the reduction of $Fe_2O_3$ is not caused by the graphite crucible and instead is likely caused by the presence of $Fe^0$.

Example 2c

Figure 3:
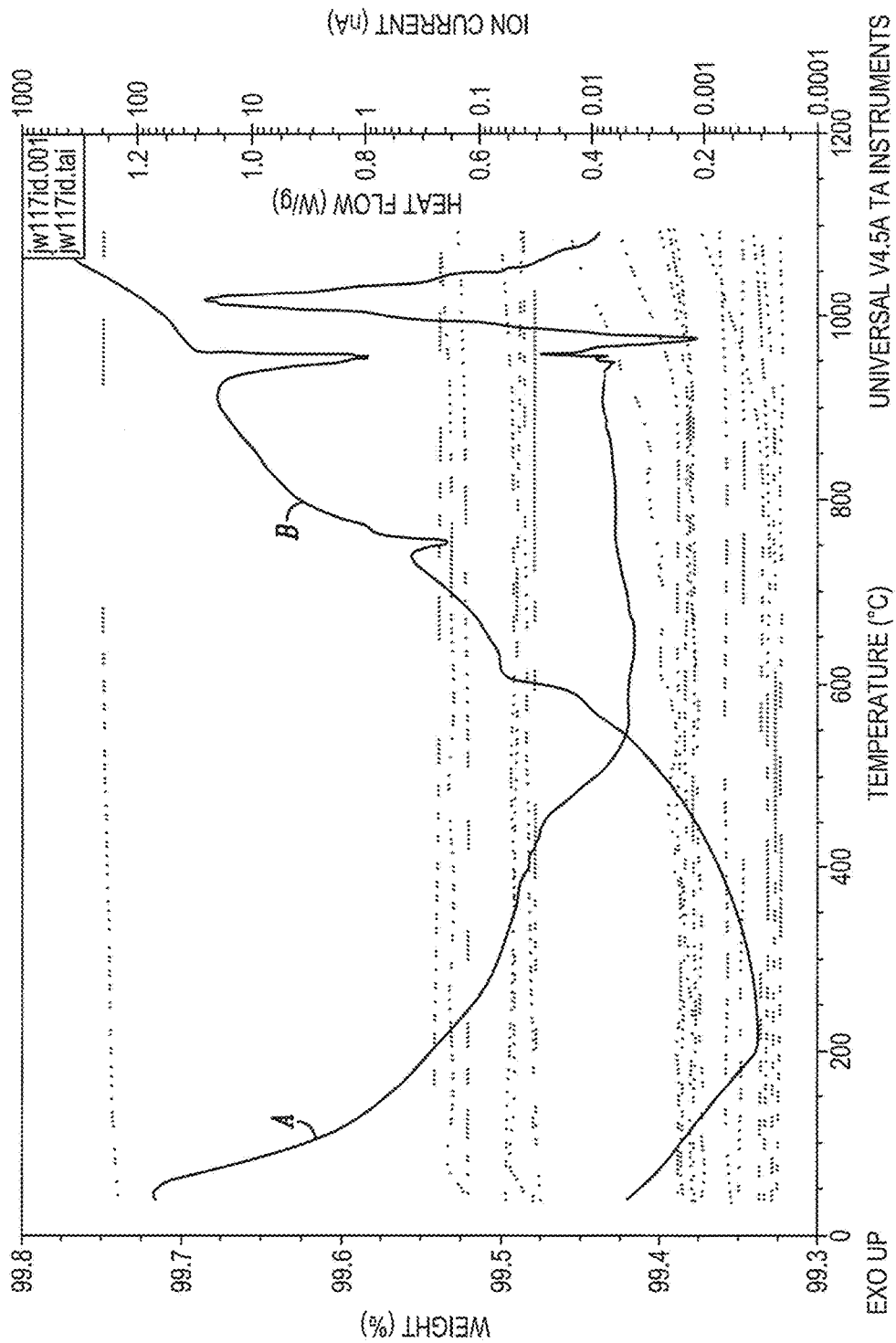
FIG. 3 shows a non-limiting illustrative Thermo gravimetric analysis in combination with differential scanning calorimetry and mass spectrometer (TGA-DSC-MS) at 10° C./min of a mixture of 1 $LiPO_3$+⅓ $Fe_2O_3$+⅓ $Fe^0$ described in Example 2a. Weight loss (A), Heat flow (B). The dashed curves are for gases: $CO_2$ (lower), CO and $H_2O$ (higher).

The experiment in Example 2a was reproduced under identical conditions to produce $LiFePO_4$ and the reaction was followed by a TGA-DSC-MS thermal study. FIG. 3 shows the thermal analysis (at 10° C./min) of the mixture 1 $LiPO_3 + \frac{1}{3} Fe_2O_3 + \frac{1}{3}$ Fe: the thermal reactions initiates at about 400° C. and continues up to the melting temperature (980° C.) of the end product $LiFePO_4$. Substantially no gas was released within the liquid bath and there was no significant loss of weight.

Example 2d

The experiment in Example 2a was reproduced under identical conditions to produce $LiFePO_4$. A first grinding step was performed and the grounded $LiFePO_4$ was sieved to 45 micron. A second grinding step was performed in isopropanol alcohol (IPA) for 1 hour so as to obtain particles having about 100 nm in size. The particles were then impregnated with a lactose solution and submitted to a thermal step (pyrolysis) to obtain particles having a carbon coating on at least a portion of their surface (C—$LiFePO_4$). The carbon coating is thus deposited by the thermal process.

These particles were used to coat a cathodic film of C—$LiFePO_4$ composite and make a $Li^0$/liquid carbonate+$LiPF_6$ electrolyte/C—$LiFePO_4$ standard button cell according to the following procedure.

C—$LiFePO_4$, HFP-$VF_2$ copolymer (Kynar® HSV 900, supplied by Atochem) and an EBN-1010 graphite powder (supplied by Superior Graphite) were ball milled in a jar mill with zirconia beads in N-methyl-pyrrolidone (NMP) for 10 hours in order to obtain a dispersion of C—$LiFePO_4$/HFP-$VF_2$/graphite in a ratio of 80/10/10 by total weight. The dispersion obtained was subsequently deposited, using a Gardner® device, on a sheet of aluminum carrying a carbon-treated coating (supplied by Exopack Advanced Coating) and the deposited film was dried under vacuum at 80° C. for 24 hours to make the cathode electrode. A battery of the "button" type was assembled and sealed in a glovebox using a film of lithium as the anode and a separator having a thickness of 25 μm (supplied by Celgard) impregnated with a 1M solution of $LiPF_6$ in an EC/DEC 3/7 mixture.

Figure 4:
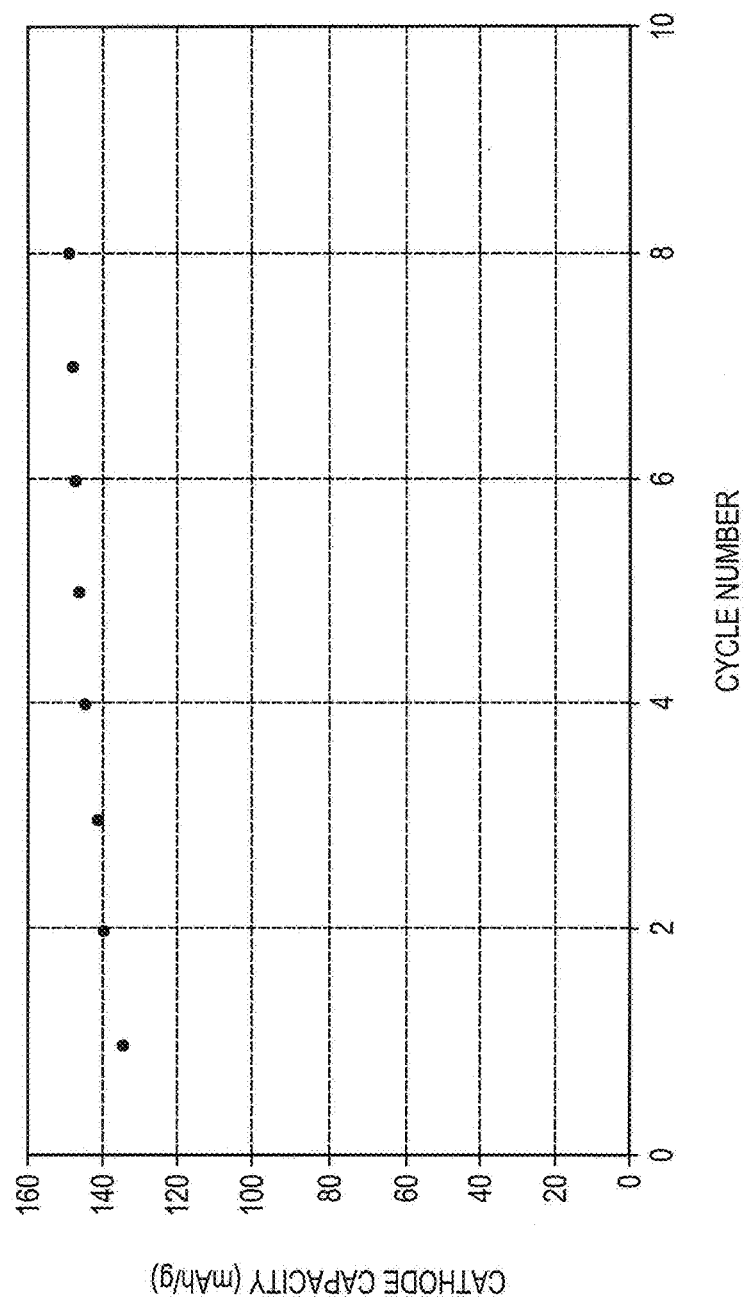
FIG. 4 shows a non-limiting illustrative initial cycling capability assay (mAh/g) for a button cell comprising the product made in Example 2 evaluated at ambient temperature at a C/10 rate for the first 8 cycles.

This button cell was evaluated for initial cycling capability at ambient temperature at a C/10 rate (a 1C rate corresponding to discharge of full capacity in 1 hour). FIG. 4 shows the specific discharge and charge capacities of the button cell for the first 8 cycles.

Example 3

Preparation of $LiFePO_4$ from $LiPO_3$

A thermal step was performed on a mixture of stoichiometric quantities of 9.26 g. $Fe_3O_4$ (Bayer magnetite pigment), 13.74 g. $LiPO_3$ and 2.23 g. $Fe^0$ (QMP Atomet grade 195SP<45 microns) under an air atmosphere in a graphite crucible container held at 1100° C. A Grafoil lid was used on the top of the precursor mixture. Timcal graphite (Timcal graphite and carbon, Bodio, Switzerland) was added on the lid and did not make physical contact with the precursor thus creating a local $CO/CO_2$ non oxidizing atmosphere upon thermal treatment. A second Grafoil lid was used on top of the Timcal graphite.

Figure 5:
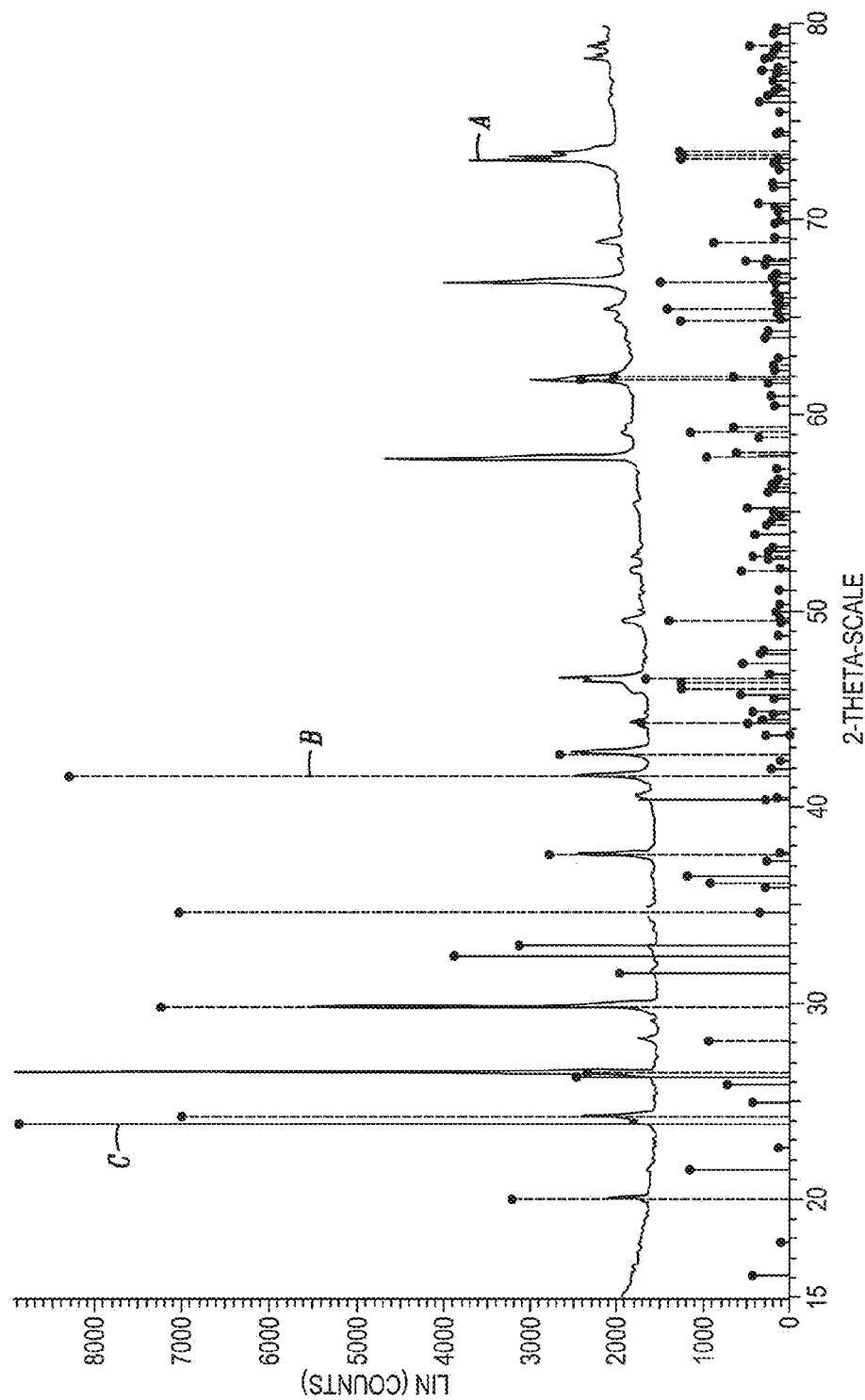
FIG. 5 shows a non-limiting illustrative XRD assay at 25° C. result for the product obtained in Example 3 (A). 2Th/Th locked—Start: 14.869°—End: 79.901°—Step: 0.011°—Step time: 90.1 s—Time started: 13 s—2-Theta: 14.869°—Theta: 7.500°—Chi: 0.0. The figure also shows a non-limiting illustrative XRD standard pattern for $Li_4P_2O_7$ (B). Y: 100.01%—dxby: 1. —WL: 1.78897—Triclinic—a 8.56130—b 7.11000—c 5.18510—alpha 111.441—beta 89.986—gamma 103.065—Primitive—P-1 (2)—2—284.99. The figure also shows a non-limiting illustrative XRD standard pattern for substantially pure $LiFePO_4$ (C). Y: 92.24%—dxby: 1. —WL: 1.78897—Orthorhombic—a 10.32900—b 6.00650—c 4.69080—alpha 90.000—beta 90.000—gamma 90.000—Primitive—Pnma (62).

A thermal step was performed for ½ hour at 1100° C. Substantially no gas was released within the liquid bath. The crucible was then agitated by hand to stir the liquid bath. The furnace was then cooled down to 700° C. The crucible was then rapidly immersed in oil to cool down the resulting product substantially without contact with ambient air. The graphite powder remained essentially intact despite the exposure to air. FIG. 5 shows the XRD pattern of the resulting product as being substantially identical to that one of pure crystalline $LiFePO_4$, with minimal presence of $Li_4P_2O_7$. The resulting chemical reaction thus corresponds to:

$$Fe_3O_4 + Fe^0 + 4LiPO_3 \rightarrow 4LiFePO_4$$

Example 4

Preparation of $LiMnPO_4$ and $Li_{1.2}MnPO_4$ from $LiPO_3$

Example 4a

Figure 6:
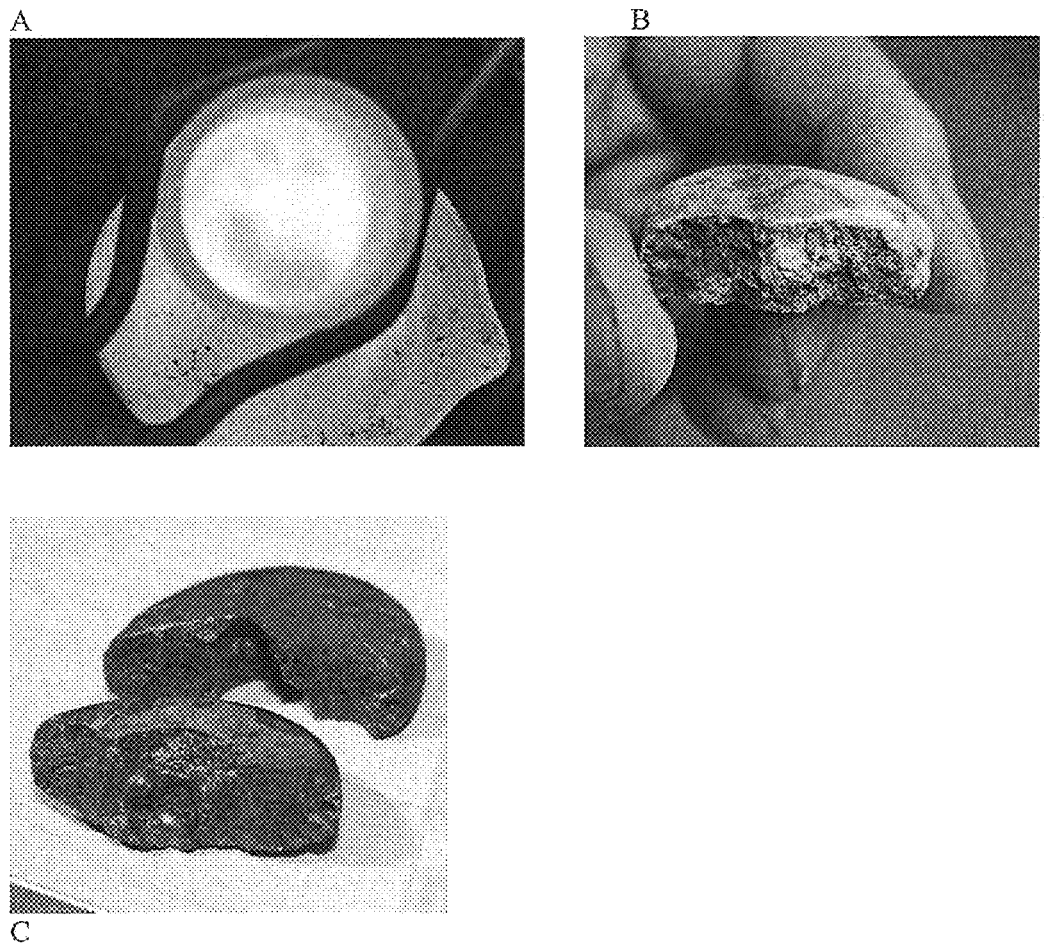
FIG. 6(A) shows the liquid bath of Example 4a comprising molten stoichiometric $LiMnPO_4$ maintained at 1100° C. and held in a graphite crucible under air to which a solid mixture of MnO and $LiPO_3$ have been added.
FIG. 6(B) shows a material obtained after solidification of a sample portion of the liquid bath in Example 4a. The material has a heterogeneous color pattern suggesting a heterogeneous composition.
FIG. 6(C) shows a material obtained after solidification of a portion of the liquid bath in Example 4b where the material has a substantially homogeneous coloration suggesting a homogeneous composition.

A mixture of stoichiometric quantities of 23.65 g. $LiPO_3$ and 28.64 g. MnO was made. A thermal step was performed on a first half portion of the mixture under an air atmosphere in a graphite crucible container held at 1100° C. Upon substantially melting all the mixture and obtaining a liquid bath, the remaining second half portion of the mixture was introduced into the liquid bath. The second half of the mixture was absorbed into the liquid bath in less than about a minute as shown in FIG. 6(A) illustrating the benefit of a liquid reaction bath. Substantially no gas was released within the liquid bath during introduction of the second half of the mixture.

A first sample portion was taken from the liquid bath and atomized on a high speed rotating Grafoil disk of 5 cm diameter. A second sample portion was taken corresponding to roughly a quarter volume of the liquid bath and put in another crucible to slowly cool down so as to obtain a solidified material. An XRD assay showed that the product obtained was $LiMnPO_4$.

An additional amount of about 4.7 g. $LiPO_3$ was then added to the remaining liquid bath held at 1100° C. Substantially no gas was released within the liquid bath. A third sample portion was taken and put in another crucible to slowly cool down so as to obtain a solidified material. FIG. 6(B) shows the material obtained after solidification of the third sample. The material has a heterogeneous color pattern suggesting a heterogeneous composition likely due to heterogeneous phases within the liquid bath.

Example 4b

Figure 7:
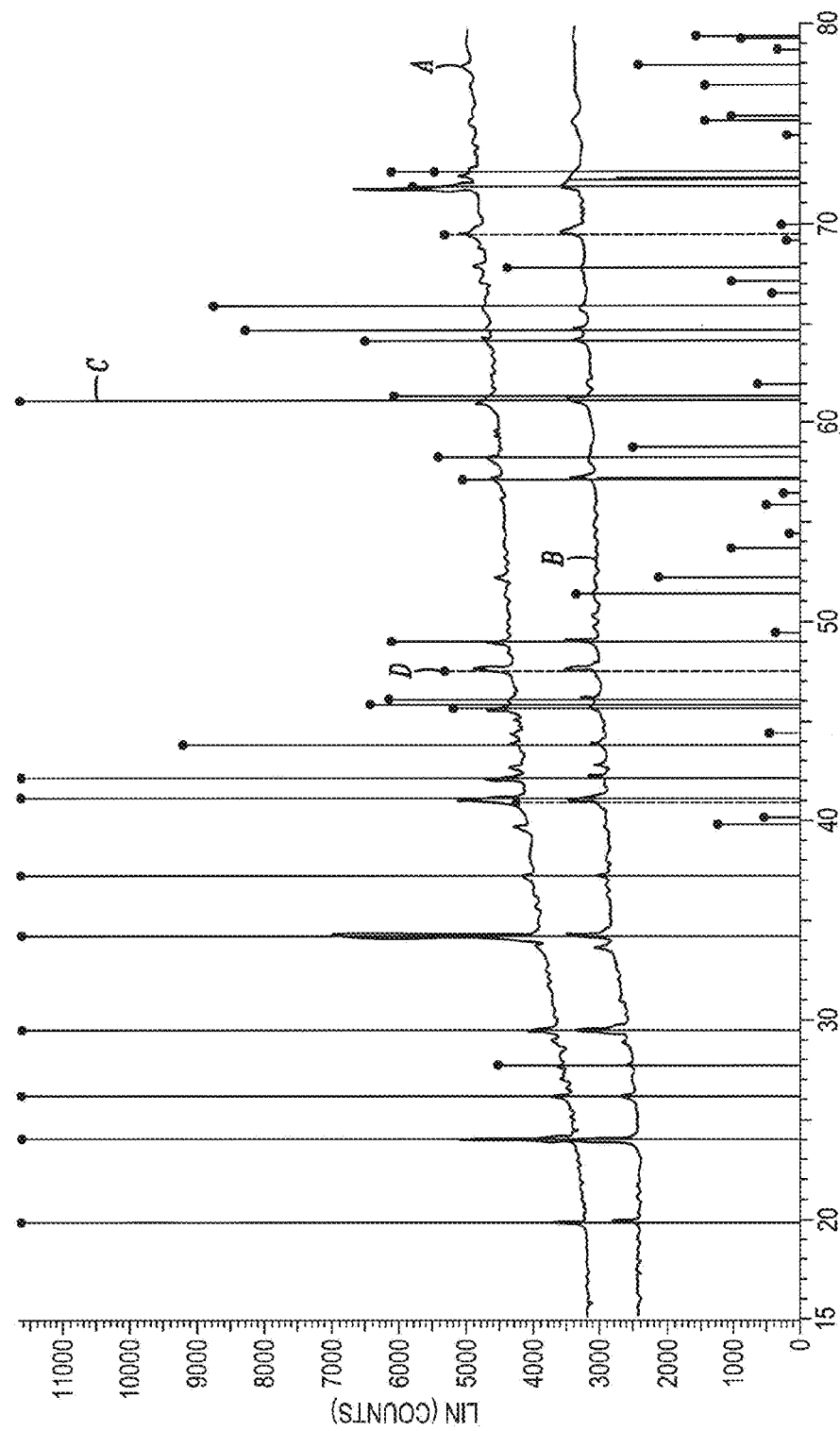
FIG. 7 shows a non-limiting illustrative XRD assay at 25° C. result for the compounds obtained in Example 4a after the first thermal step (A). 2Th/Th locked—Start: 15.000°—End.

An additional thermal step was performed on the solidified material obtained from the third sample portion of Example 4a at 1100° C. using a graphite crucible. The resulting liquid bath was rapidly manually stirred with a SS laboratory spatula for about one minute. Substantially no gas was released within the liquid bath. The liquid bath was then slowly cooled down so as to obtain a solidified material. FIG. 6(C) shows that the resulting product was a substantially homogeneous product. FIG. 7 shows that the product obtained was $Li_{1.2}MnPO_4$. The resulting XRD pattern was very similar to that one of substantially pure $LiMnPO_4$ suggesting that the additional $LiPO_3$ may be present as an additional non-crystalline phase.

Example 5

Preparation of $LiFePO_4$ from $LiPO_3$ and Natural Minerals

Example 5a

A natural mineral concentrate from the Quebec North-Shore produced for the steel industry was used as a raw material and low cost source of iron. The mineral composition per % weight was: 65.77% Fe (including 6.88% as FeO), 0.9% Mn, 4.60% $SiO_2$, 0.2% $Al_2O_3$, 0.37% CaO and 0.28% MgO. The mineral was dried and grounded to <200 mesh.

A mixture of 25 g. of grounded mineral, 7.553 g. of iron metal droplets (<150 microns) from QMP (Atomet 195SP) and 36.914 g. $LiPO_3$ was made in a mortar. 13.33 g. of $LiFePO_4$ powder was first added to a graphite crucible to act in the liquid bath as the electrode material in the melted state. The mixture was then added on top of the $LiFePO_4$ powder. Timcal Super C65 graphite powder was placed on top of the reactants and a Grafoil lid was adjusted on top of the crucible.

A thermal step was performed on the reactants at 1080° C. under an air atmosphere for 3 hours. Substantially no gas was released within the liquid bath. The liquid was then stirred and rapidly casted and cooled in a graphite mold. Despite some superficial oxidation from casting and cooling under air visible on FIG. 8a, the $LiFePO_4$ obtained had a clean XRD pattern (FIG. 8b) with a 96.8% purity, about 3.2% $Li_3PO_4$ excess and large crystallites (178 nm) typical of these melts. This example shows the benefit of the process of the invention using coarsely grinded and mixed precursors.

Without being bound by any theory, as the non electroactive $Li_3PO_4$ phase was observed in the $LiFePO_4$ powder used at the bottom of the crucible, one can assume that this phase was not necessarily associated with the mineral synthesis as such.

Example 5b

The experiment in Example 5a was reproduced under identical conditions except for replacing the $Fe^0$ droplets (for $Fe^{3+}$ reduction) with 10 g. of microcrystalline cellulose powder (Aldrich 435236) and for using a two step thermal treatment. It is well known that thermal treatment (pyrolysis) of cellulose powder generates reductive gases and carbon residue (wood charcoal).

The two step thermal treatment was as follows. A first thermal step was performed on the graphite crucible at 600° C. for 2 hours to transform the cellulose powder and reduce the $Fe^{3+}$ to $Fe^{2+}$. A second thermal step was performed at 1080° C. for 3 hours with hand stirring to obtain the liquid bath comprising the melted $LiFePO_4$ and react the mineral with $LiPO_3$. Substantially no gas was released within the liquid bath. The liquid bath was then cooled 1 hour at 800° C., then 1 hour at 600° C., and then rapidly cooled under air. The solidified product had similar characteristic as that one obtained in Example 5a.

Example 5c

The experiment in Example 5a was reproduced under identical conditions except for replacing the crucible with a Clay graphite crucible using carbon graphite powder and a Grafoil lid to confine the liquid bath in a reducing atmosphere.

After the thermal step at 1080° C. for 3 hours with occasional stirring, the liquid bath was poured in a graphite crucible with some carbon powder and maintained at 1080° C. for 1 h. The graphite crucible was then slowly cooled down to 750° C. and maintained at this temperature for 1 h to obtain olivine phase crystal growth. The graphite crucible was rapidly cooled down to avoid significant $LiFePO_4$ oxidation under air.

The material obtained had similar XRD results and purity as that one of Examples 5a and 5b. Further micrographic examination reveals that the material also contains secondary phases present at inter-crystalline areas. The secondary phases include lithium phosphate rich crystalline phases and non-carbon non-olivine phases containing Li—Fe—$PO_4$ and Si and Al. The presence of secondary phases at inter-crystalline areas (outside the olivine crystal structure) demonstrates that, if desired, one can further purify the material from impurities present in the precursors by removal of such secondary phases.

Example 6

Preparation of $LiCa_{0.02}Mn_{0.98}PO_4$ from $LiPO_3$ $LiCa_{0.02}Mn_{0.98}PO4$ was prepared using a mixture of $LiPO_3$, MnO and CaO as precursors. Briefly, a thermal step was performed on the mixture at 1100° C. under an air atmosphere. Substantially no gas was released within the liquid bath. XRD and XPS analysis confirm the structure XRD characteristics and the presence of Ca in solid solution into the lithium manganese phosphate crystals.

Example 7

Preparation of $LiFePO_4$ from $Fe_3(PO_4)_2$

Example 7a

A thermal step was performed on $Fe_3(PO_4)_2.8H_2O$ (vivianite) at 650° C. under an inert nitrogen atmosphere to substantially remove water from the vivianite. The precursor was then used in stoichiometric amounts to make a mixture with $Li_3PO_3$. A thermal step was performed on the mixture at 1050° C. in a graphite crucible under an inert nitrogen atmosphere with gentle stirring of the resulting liquid bath. Substantially no gas was released within the liquid bath. Some graphite powder was left at the surface of the liquid bath to keep a local non-oxidative atmosphere.

The liquid bath was then cooled down to obtain a solidified material. The XRD analysis of the solidified material was substantially identical to the one depicted in FIG. 2 and showed that the resulting product was $LiFePO_4$.

Example 7b

The experiment in Example 7a was reproduced under identical conditions except for removing the graphite powder before the cooling step. The resulting product was also $LiFePO_4$.

Example 7c

The experiment in Example 7a was reproduced under identical conditions except for the use of a slightly reducing atmosphere during the degassing of $Fe_3(PO_4)_2.8H_2O$ in order to ensure avoiding iron oxidation. The resulting product was also $LiFePO_4$.

Example 7d

The experiment in Example 7a was reproduced under identical conditions except that the degassing step was performed after making the mixture of $Fe_3(PO_4)_2.8H_2O$ and $Li_3PO_3$. The resulting product was also $LiFePO_4$.

Example 8

Preparation of $LiFePO_4$ or $LiCa_{0.02}Mn_{0.98}PO_4$ from already synthesized electrode material precursor and using an additional non-miscible metal liquid in the liquid bath.

Example 8a

A mixture was made with 36.0 g. of Cu, 16.2 g. of Sn and 50.4 g. of already synthesized $LiFePO_4$ in a graphite crucible. A first Grafoil lid was placed to cover the mixture, graphite powder was placed on top of the first lid and a second Grafoil lid was placed on top of the graphite powder to create a local $CO/CO_2$ non-oxidizing atmosphere upon thermal treatment (for example at 700° C.). The crucible was then introduced in a resistive furnace operating in air and a thermal step was performed at 1100° C. for two hours to obtain two liquid phases in the liquid bath. Substantially no gas was released within the liquid bath. The second thermal step was performed while also performing manual stirring. After the two hours, the two liquid phases were casted in a flat graphite mold at ambient temperature. The Sn—Cu phase and the $LiFePO_4$ phase separated completely confirming the thermodynamic stability of liquid tin in the presence of the liquid $LiFePO_4$ phase.

The copper content of the resulting $LiFePO_4$ is 2651 ppm as found by atomic absorption tests.

Example 8b

The experiment in Example 8a was reproduced under identical conditions except for making a mixture with 43.8 g. of Cu and 17.9 g. of Sn and 42.7 g. of already synthesized $LiCa_{0.02}Mn_{0.98}PO_4$ in a graphite crucible and directly introducing the crucible in a furnace and performing a thermal step at 1100° C. for two hours. FIG. 9 shows that upon casting, the Sn—Cu phase and the $LiCa_{0.02}Mn_{0.98}PO_4$ phase separated completely.

The copper content of the resulting $LiCa_{0.02}Mn_{0.98}PO_4$ is 379 ppm as found by atomic absorption tests.

Without being bound to any particular theory, it is believed that the different copper content in $LiCa_{0.02}Mn_{0.98}PO_4$ relative to the $LiFePO_4$ of Example 8a may result from the difference in capacity of $Cu^0$ to reduce the Fe ion relative to the Mn ion.

In specific applications where copper content in the electrode material may not be desirable, for example when such content may negatively affect overall cell cycling performance, one of skill may use Sn or Sn alloys without significant Cu to minimize or avoid Cu content in the resulting electrode material.

Example 9

Preparation of $LiFePO_4$ from $LiPO_3$

Example 9a

A mixture was made with $LiPO_3$, $Fe^0$ and coarsely grounded (200 mesh) natural mineral source of iron (including $FeO+Fe_2O_3$) in a graphite crucible. A first Grafoil lid was placed to cover the mixture, graphite powder was placed on top of the first lid and a second Grafoil lid was placed on top of the graphite powder to create a local $CO/CO_2$ non-oxidizing atmosphere upon thermal treatment (for example at 700° C.). A thermal step was performed at 1100° C. for two hours. The second thermal step was performed while also performing manual stirring. The liquid bath was then cooled down to obtain a solidified material. The resulting product was about 96% pure $LiFePO_4$.

Example 9b

The experiment in Example 8 was reproduced under identical conditions except for using a clay graphite crucible to also produce about 96% pure $LiFePO_4$. Some silica was observed in lower melting non-carbon non-olivine phase peripheral to the product olivine crystal structure, which lower melting phase were formed during the solidification step.

Example 10

Preparation of a Sn—Fe alloy for use as an additional non-miscible metal liquid phase in the synthesis of $LiFePO_4$.

A mixture of 15 g. $Fe^0$ (QMP droplets) was made with 0.5 g. graphite. 70 g. of pure Sn were then added to the mixture. The mixture was placed in a graphite crucible. Timcal Super C graphite powder was placed on top of the mixture and a Grafoil lid was placed on top of the crucible to avoid ambient air oxidation of Fe and Sn. A thermal step was performed at 1080° C. for one hour. After stirring, the crucible was rapidly cooled to ambient temperature. The partial dissolution of Fe into Sn in the experimental conditions of $LiFePO_4$ synthesis was clearly visible.

Example 11

The process was also used to prepare $LiFe_{0.9}Mg_{0.1}PO_4$, $LiFe_{0.65}Mn_{0.3}Mg_{0.05}PO_4$, $LiMn_{0.675}Fe_{0.275}Mg_{0.05}PO_4$, $Li_{0.9}Na_{0.1}FePO_4$, $NaFePO_4$, $LiFe(PO_4)_{0.95}$ $(SiO_4)_{0.05}$, $LiFePO_4$ doped with Cr, $LiFePO_4$ doped with Mo, and $LiFe_{0.95}Mg_{0.05}PO_4$ using in each case, a suitable precursor as described herein.

The following non-limiting embodiments provide a further description of non-limiting examples of a process, a material and an apparatus in accordance with the present invention:

Embodiment 1

A process for preparing a crystalline electrode material, the process comprising: providing a liquid bath comprising the electrode material in a melted state; and introducing a precursor of the electrode material into the liquid bath, wherein the electrode material comprises lithium, a metal and phosphate.

Embodiment 2

A process according to embodiment 1, further comprising withdrawing a portion of the liquid bath and inducing solidification of the portion so as to obtain a solidified electrode material. Optionally, the process further comprises removing an impurity-containing phase from the solidified electrode material.

Embodiment 3

A process according to embodiment 2, wherein said inducing solidification step comprises a cooling step, a casting step or an atomization step.

Embodiment 4

A process according to embodiment 2, further comprising a pulverization step of the solidified electrode material so as to obtain particles of said solidified electrode material.

Embodiment 5

A process according to embodiment 4, said process further comprising adding an organic source of carbon prior to, concomitant with, or after said pulverization step, and heating to obtain a carbon coating on at least part of the surface of the electrode material particles.

Embodiment 6

A process according to any one of embodiments 1 to 5, wherein the liquid bath is maintained at a temperature between the melting temperature of the electrode material and about 300° C. above the melting temperature, preferably between the melting temperature of the electrode material and about 150° C. above the melting temperature, so as to maintain the electrode material in said melted state.

Embodiment 7

A process according to embodiment 6, wherein assisted convection is performed while maintaining the liquid bath at said temperature.

Embodiment 8

A process according to any one of embodiments 1 to 7, wherein said precursor is selected from the group consisting of an already synthesized electrode material, a natural occurring source compound for the electrode material, a chemical reactant that is a source for an element of the electrode material, and any combinations thereof. Preferably, when the metal comprises Mn or Fe, the natural occurring source compound is an oxide containing magnetite or hematite.

Embodiment 9

A process according to any one of embodiments 1 to 8, wherein said liquid bath comprises a first liquid and a second liquid, or a gas, or a solid, wherein said first liquid comprises said electrode material in a melted state.

Embodiment 10

A process according to embodiment 9, wherein said second liquid comprises Cu—Sn, Sn, or a Sn alloy.

Embodiment 11

A process according to any one of embodiments 1 to 10, wherein said liquid bath is in the presence of carbon or an organic carbon source in an amount sufficient to prevent oxidation of the oxidation state of at least one metal in the precursors without full reduction to an elemental state.

Embodiment 12

A process according to any one of embodiments 1 to 11, wherein the precursor comprises a lithium source selected from the group consisting of lithium oxide, lithium hydroxide, lithium carbonate, $Li_3PO_4$, $LiH_2PO_4$, $LiNaHPO_4$, $LiKHPO_4$, $Li_2HPO_4$, lithium ortho-, meta- or polysilicates, lithium sulfate, lithium oxalate, lithium acetate, and any mixtures thereof.

Embodiment 13

A process according to embodiment 12, wherein the precursor further comprises a source for a lithium substituent selected from the group consisting of sodium oxide, sodium hydroxide, potassium hydroxide, sodium carbonate, potassium carbonate, $Na_3PO_4$, $K_3PO_4$, $NaH_2PO_4$, $KH_2PO_4$, sodium or potassium ortho-, meta- or polysilicates, sodium sulfate, potassium sulfate, sodium oxalate, potassium oxalate, sodium acetate, potassium acetate, and any mixtures thereof.

Embodiment 14

A process according to any one of embodiments 1 to 13, wherein the precursor comprises a metal source selected from the group consisting of iron, iron(III) oxide or magnetite, trivalent iron phosphate, lithium iron hydroxyphosphate or trivalent iron nitrate, ferrous phosphate, hydrated or nonhydrated, vivianite $Fe_3(PO_4)_2$, iron acetate $(CH_3COO)_2Fe$, iron sulfate ($FeSO_4$), iron oxalate, iron(III) nitrate, iron(II) nitrate, $FeCl_3$, $FeCl_2$, FeO, ammonium iron phosphate ($NH_4FePO_4$), $Fe_2P_2O_7$, ferrocene, and any mixtures thereof; manganese, MnO, $MnO_2$, manganese acetate, manganese oxalate, Mn(III) acetylacetonate, Mn(II) acetylacetonate, Mn(II) chloride, $MnCO_3$, manganese sulfate, manganese nitrate, manganese phosphate, manganocene, and any mixtures thereof; iron and manganese phosphates or pyrophosphates; and any mixtures thereof.

Embodiment 15

A process according to embodiment 14, wherein the precursor further comprises a source of a metal substituent selected from the group consisting of a source of Mg, Ca, Al and B, Nb, Zr, Mo, V, Cr, Fe(III), and any combinations thereof.

Embodiment 16

A process according to any one of embodiments 1 to 15, wherein the precursor comprises a phosphate source selected from the group consisting of a phosphorus oxide, a phosphate, a polyphosphate, a pyrophosphate in salt and acidic forms thereof, and any combinations thereof.

Embodiment 17

A process according to embodiment 16, wherein the precursor further comprises a source of a phosphate substituent selected from the group consisting of organosilicon, silicon alkoxides, tetraethyl orthosilicate, nanosized $SiO_2$, $Li_2SiO_3$, $Li_4SiO_4$, $SO_4$ sources, $BO_3$ sources, and any mixtures thereof.

Embodiment 18

A process according to any one of embodiments 1 to 17, wherein the precursor further comprises a single or a plurality of doping element source(s) selected for example from $MoO_3$, oxide, sulfate or nitrate of Ni, oxide, sulfate or nitrate of Co, $Cr(NO_3)_3$, $Cr_2O_3$, $CrPO_4$, and any mixtures thereof.

Embodiment 19

A process according to any one of embodiments 1 to 18, wherein at least a portion thereof is carried out under an inert atmosphere, a partially reducing atmosphere, or a reducing atmosphere.

Embodiment 20

A process according to embodiment 19, wherein said partially reducing atmosphere or reducing atmosphere comprises at least one gas selected from the group consisting of CO, $H_2$, $NH_3$, HC and any mixtures thereof, wherein HC represents a hydrocarbon.

Embodiment 21

A process according to any one of embodiments 1 to 20, wherein said liquid bath is in the presence of carbon under ambient air, wherein the carbon is in an amount sufficient to prevent oxidation of a metal in the liquid bath.

Embodiment 22

A process according to embodiment 21, wherein the liquid bath is held in an enclosure, wherein at least a portion of the enclosure is made of graphite or graphite-silicon, alumina or zirconia.

Embodiment 23

A process according to any one of embodiments 1 to 22 for preparing a crystalline electrode material, having an olivine structure, the material comprising particles having the nominal formula $AM(PO_4)$, wherein A is lithium, substituted by less than 20% atomic weight of said A, of Na or K; M is Fe, Mn, or a mixture thereof, substituted by less than 15% atomic weight of said M, of an atom selected from the group consisting of: Mg, Ca, Al and B, Nb, Zr, Mo, V and Cr, Fe(III), and any combinations of (a), (b) and (c); and wherein the $PO_4$ is substituted by less than 20% atomic weight (relative to phosphate) of a phosphate substituent selected the group consisting of $SO_4$, $SiO_4$, $BO_4$, $P_2O_7$ and any combinations thereof.

Embodiment 24

A process according to embodiment 23, wherein the particles have the nominal formula $Li(Fe_{1-x}Mn_x)PO_4$, wherein $0 \leq x \leq 1$.

Embodiment 25

A process according to 23, wherein the particles have the nominal formula $LiFePO_4$.

Embodiment 26

A process according to any one of embodiments 23 to 25, said particles having a non-carbon and non-olivine phase comprising Li-M, or M-P, or Li—P—O, or any combinations thereof, said non-carbon and non-olivine phase present on at least a portion of the surface thereof, and optionally further comprising Si, Zr and Al.

Embodiment 27

A process according to embodiment 26, wherein the non-carbon and non-olivine phase is present at less than 15 wt. %, or less than 10 wt. %, or less than 5 wt. % relative to the weight of the electrode material.

Embodiment 28

A process according to any one of embodiments 23 to 27, said particles having a non-powdery and adherent carbon coating on at least a portion of the surface thereof.

Embodiment 29

A process according to embodiment 28, said carbon coating being deposited on the surface by a thermal process.

Embodiment 30

A crystalline electrode material made by the process according to any one of embodiments 1 to 28.

Embodiment 31

A crystalline electrode material, having an olivine structure, the material comprising lithium substituted with less than 20% atomic weight of Na or K; a metal selected from Fe, Mn, and a mixture thereof, substituted by less than 15% atomic weight of an atom selected from the group consisting of: (a) Mg, Ca, Al and B, (b) Nb, Zr, Mo, V and Cr, (c) Fe(III), and (d) any combinations thereof; and $PO_4$, substituted with less than 20% atomic weight of an oxyanion selected from the group consisting of $SO_4$, $SiO_4$, $BO_4$, $P_2O_7$, and any combinations thereof, wherein the material is in the form of particles, the particles having on at least a portion of the surface thereof a non-carbon and non-olivine phase, and optionally a non-powdery adherent carbon coating.

Embodiment 32

A crystalline electrode material according to embodiment 31, wherein the non-carbon and non-olivine phase is present at less than 15 wt. %, or less than 10 wt. %, or less than 5 wt. % relative to the weight of the electrode material.

Embodiment 33

A crystalline electrode material according to embodiment 31 or 32, wherein the particles have a particle size distribution comprising a plurality of mean particle sizes, and where the plurality of mean particle sizes have a heterogeneous non-carbon and non-olivine phase content.

Embodiment 34

A crystalline electrode material according to any one of embodiments 31 to 33, wherein the electrode material comprises individual particles and agglomerates thereof, where the size of the individual particles is between about 10 nm and about 3 µm, and the size of agglomerates is between about 100 nm and about 30 µm.

Embodiment 35

A crystalline electrode material according to embodiment 34, wherein the agglomerates are obtained by: (1) partial sintering of the particles during a thermal step, or (2) bridging the particles with the non-powdery adherent carbon coating, or (3) bridging the particles with the non-carbon and non-olivine phase, or (4) any combinations thereof.

Embodiment 36

A crystalline electrode material according to any one of embodiments 31 to 35, wherein the particles have the nominal formula $Li(Fe_{1-x}Mn_x)PO_4$, wherein $0 \leq x \leq 1$.

Embodiment 37

A crystalline electrode material according to any one of embodiments 31 to 35, wherein the particles have the nominal formula $LiFePO_4$.

Embodiment 38

A crystalline electrode material according to any one of embodiments 31 to 43, wherein the non-carbon non-olivine phase comprises Li—P—O, optionally further comprising Si, Zr and Al.

Embodiment 39

A crystalline electrode material according to any one of embodiments 31 to 38, wherein said carbon coating is present on at least a portion of the surface of the particles.

Embodiment 40

A crystalline electrode material according to embodiment 39, said carbon coating being deposited on the surface of the particles by a thermal process.

Embodiment 41

A melt synthesis method to make a crystalline electrode material in a powder form of the general formula $LiMXO_4$ in which Li is essentially lithium, M includes at least iron or manganese or both as a $M^{+3}/M^{+2}$ active redox couple and X is an non-metal comprising at least phosphorus, the method comprising at least the following steps and characteristics:

a—a step of introducing, separately or in combination the precursors source of Li, M, X and O and reacting them together in a heated liquid reaction media to form a liquid bath of the general $LiMXO_4$ composition, said step being characterized by the fact that no or few reaction gas product is generated or released by the precursors upon melting, thus making possible to feed at a high rate, continuously or semi-continuously, the precursors into the liquid reaction media without liquid projection or foaming, b—a step in which the liquid reaction media is homogenized by assisted convection, including mechanical stirring and gas injection, in order to rapidly combine and equilibrate the elements of the general $LiMXO_4$ composition in the liquid state, in the presence or not of another liquid or insoluble solid phase or of reducing gas phase in order to fix each component activities in the $LiMXO_4$ melt composition.

c—a step in which the liquid bath of the general $LiMXO_4$ composition is extracted in a continuous or semi-continuous operation from the reaction media and solidified thought one or more cooling steps to obtain a solid material of the general formula $LiMXO_4$ d—one or more steps to reduce the solid material of the general $LiMPO_4$ composition to powder at the micron or nanometer scale present as elementary or in agglomerated particle form e—at least one heat treatment step in which a carbon deposit is made on the powder by pyrolysis of an organic material, in order to get at least a crystalline phase of the olivine structure and of the general $LiMPO_4$ composition in the presence of a carbon phase and optionally of at least another non-olivine phase obtained during solidification and pyrolysis steps; each steps being done in sequence.

Embodiment 42

The method of embodiment 41 in which the precursors source of M comprises at least an iron compound at the oxidation state of 0, +2 or +3 or combination thereof or a manganese compound of the oxidation state of 0, +2, +3 or +4 or combination thereof.

Embodiment 43

The method of embodiment 42 in which the precursors source of M includes at least one compound selected among: iron metal, oxides FeO, $Fe_2O_3$, $Fe_3O_4$, or natural mineral compositions of any given $Fe^{+2}/Fe^{+3}$ ratio, $Fe_2P_2O_7$, manganese metal, oxides MnO, $MnO_2$ or iron and manganese phosphates or pyrophosphates or combination thereof.

Embodiment 44

The method of embodiment 41 in which the precursors source of P comprise at least phosphorus oxides, phosphates, metaphosphate, polyphosphate, pyrophosphates in salt and acidic forms or combination thereof

Embodiment 45

The method of embodiment 41 in which the precursors source of Li comprises at least one of: $Li_2O$, $Li_2CO_3$, LiOH, $Li_2SO_4$, $Li_4SiO_4$ or $Li_3PO_4$, $Li_4P_2O_7$, $LiPO_3$ and mixtures thereof.

Embodiment 46

The method of embodiments 41 to 45 in which at least two sources of M, P or Li are reacted together and degassed before their reaction in the heated liquid reacting media of embodiment 67.

Embodiment 47

The method of embodiment 46 in which at least two sources of M, P or Li are combined together and degassed if need be and selected among: $Fe_3(PO_4)$, $Mn_3(PO_4)$, $Fe_2P_2O_7$, $Mn_2P_2O_7$, $Li_3PO_4$, $Li_4P_2O_7$, $LiPO_3$ or any intermediate composition comprised between $Li_3PO_4$ and $LiPO_3$, or more generally between $Li_2O$ and $P_2O_5$

Embodiment 48

The method of embodiment 41 in which the liquid reaction media is the liquid bath of general composition $LiMXO_4$ itself in which the ratio of any constituent of Li-M-$XO_4$ might deviate from the exact stoichiometry 1-1-1 by less than a ±0.2 ratio in order to adjust any constituent chemical activity in the melt.

Embodiment 49

The method of embodiment 48 in which one or more minority constituents of the general $LiMXO_4$ liquid bath composition can be present, at a less than 0.1 atomic ratio, as ions, including other alkali metals, fixed valency cations including Mg, Ca, Al, B, or multivalent transition metals cations, or oxyions including sulfates, borates, silicates or, fluoride anion

Embodiment 50

The method of embodiment 41 and 48 in which the liquid reaction media comprises also another liquid such as a metallic pool or another melt composition, or a separated solid phase co-existing with the liquid in the liquid bath of the general composition $LiMXO_4$ in order to control the metal ions or oxyanion activities and stoichiometry ratios within the $LiMXO_4$ liquid or capable to trap impurities away from the desired $LiMXO_4$ melt composition.

Embodiment 51

The method of embodiment 50 in which the liquid reaction media comprises a metallic pool whose composition is made of metal that will not be oxidized in contact with the Li, M, P elements of the liquid bath but could help the reaction kinetic while dissolving some elements of the $LiMXO_4$ composition, or fix their chemical activities or remove impurities present in this such phase.

Embodiment 52

The method of embodiment 50 in which the metallic pool composition in equilibrium with the $LiMXO_4$ liquid bath contains elements selected among Cu, Fe, Mn, Sn, Pb, Li, C, and P.

Embodiment 53

The method of embodiment 41 in which the general $LiMXO_4$ composition after solidification is essentially the same as the molten liquid bath.

Embodiment 54

The method of embodiment 53 in which the solidification in made by casting/cooling process, by float glass technique when a liquid metal pool is used or by atomisation directly from the melt state.

Embodiment 55

The method of embodiment 41 in which the general $LiMXO_4$ composition of the olivine after solidification or heat treatment is different from the molten liquid bath with the formation of one or more secondary phases distinct from the olivine structure of the $LiMXO_4$ compositions.

Embodiment 56

The method of embodiment 55 in which the controlled condition of solidification allow the physical separation of non-olivine secondary phases from the olivine structure being crystallized allowing concentration and eventually ablation of the impurity containing section of the crystallized ingot.

Embodiment 57

The method of embodiment 56 in which at least one non-olivine secondary phase contains Si, Zr or Al impurities.

Embodiment 58

The method of any one of embodiments 53 to 57 in which the solidification in made by rapid casting/cooling process or by atomisation directly from the melt state, and reduced to powder form before the heat treatment step e—that includes the pyrolytic carbon deposition, in order to induce non-olivine secondary phases formation from the general $LiMXO_4$ solid composition which are present at least at the surface of the crystalline olivine particles along with the carbon deposit.

Embodiment 59

The method of embodiment 58 in which the secondary phases are at least localized at the surface of the particles and consist of non-olivine phases whose number and compositions will depend on the heat treatment and carbon deposition condition, such as $Li_3PO_4$, $Li_4P_2O_7$, $LiPO_3$, or their intermediate compositions containing or not Fe or Mn, or $Fe_2P_2O_7$ or $Li_3Fe_2(PO_4)_3$ or other minority constituents or impurities from the precursors present or added to the general $LiMXO_4$ melt composition.

Embodiment 60

The method of embodiment 41, in which the heating is made by induction, by resistive or arc electrical heating or by combustion-gas heating under ambient atmosphere except when M is iron, in which case an inert or localized reducing or non-oxidising atmosphere is maintained during melting and casting of the liquid $LiMXO_4$ phase, such as nitrogen or oxygen-poor combustion gases are circulated or carbon powder and graphite lids are used in the crucible to burn any ingress of oxygen and generates a non-oxidizing $CO/CO_2$ mixture.

Embodiment 61

The method of any one of embodiments 41 to 60 in which the molten phase container is C or graphite, silicon carbide, clay graphite, zirconia oxide, alumina and silico aluminate and high melting temperature phosphates.

Embodiment 62

The method of embodiment 41, in which the stirring mean is a mechanical stirrer or a temporary gas injection in the liquid bath

Embodiment 63

The method of embodiment 41, in which the temperature of the heated liquid bath of the general $LiMXO_4$ composition is held between 800 and 1350° C., preferably, between 900 and 1250° C.

Embodiment 64

The method of embodiment 41 in which the pre-reacted and pre-degassed precursors are fed continuously or semi-continuously in the molten phase.

Embodiment 65

The method of embodiment 41 in which any one of the precursor or their mixture are preheated and pre-degassed continuously in a heated and gas circulated feeding screw before introduction in the molten phase.

Embodiment 66

The method of embodiment 41 in which the liquid bath of the general $LiMXO_4$ composition is continuously or semi-continuously extracted to solidification step by liquid circulation to atomisation, or decanted and poured to casting step or using other separation techniques from the liquid metal pool or slags or filtration or scooping from solid scories such as Si—Al—Ca containing solid phases or C powder associated to other non-soluble impurities such as $Fe_2P$.

Embodiment 67

Crystalline electrode material having the olivine structure obtained by any of the previous embodiments of the olivine structure and having the general composition $LiMXO_4$ in which Li is essentially lithium ion in an atomic ratio comprised between 0.9 and 1.1, M is essentially Fe or Mn or both with an total (Fe+Mn) atomic ratio comprised between 0.8 and 1.1, X in $XO_4$ is essentially P with an atomic ratio of 0.8 to 1 and O is oxygen with an atomic ratio of 3.5 to 4 vs. X, such a composition being different from the general composition of the $LiMXO_4$ formulation in the liquid molten state before cooling.

Embodiment 68

Crystalline electrode material of embodiment 67 in which intrinsic or extrinsic defects, exist in the olivine structure of the general composition LiMXO4 including anti-site defects, +3 metal ion on the M+2 sites, vacancies, insertion or ions of substitution on the Li, M, $XO_4$ sites, substitution ions being selected among other alkali metals than lithium, other transition metal than Fe or Mn including Ni, Co, V, Zr, Nb, Cr, other alkaline earth metals or Al+3 or B+3 or other oxidation state of Fe and Mn on the M+2 sites, other non-metal that phosphorus including Si, S, B, Mo, Zr, Nb for the $XO_4$ sites, fluoride ion for the O sites.

Embodiment 69

Crystalline electrode material of embodiments 67 or 68 in which the olivine structure co-exist with at least another phase that is not olivine and present as a nano dispersion or occlusions in the crystals or at the surface of the crystalline olivine, or in intercrystalline area, such second phase or phases being formed during the solidification process or during the heat treatment and the pyrolytic carbon deposition process and resulting from the difference in composition between the liquid molten phase of the general $LiMXO_4$ composition at equilibrium and the crystalline solid phase formed during the cooling or heat treatment/pyrolysis step.

Embodiment 70

Crystalline electrode material of embodiment 69, wherein after powderization, a pyrolytic carbon deposit phase co-exists with the crystalline olivine composition and at least another non-olivine phase at level of less than 10% per weight versus olivine phase said material being represented as $C$—$LiMXO_4$.

Embodiment 71

Crystalline electrode material of embodiment 70 in which at least one non-olivine phase contains at least Li—Fe or Mn—$PO_4$ and other impurities that are Si, Zr or Al.

Embodiment 72

Crystalline electrode material according to any one of embodiments 67 to 70 that is powderized at the nano scale level and is characterised by a coating of pyrolytic carbon.

Embodiment 73

Intermediary composition obtained by solidification of the liquid bath of the general composition $LiMXO_4$ as defined in embodiment 41, characterised by the fact that the solid material obtained after solidification, including atomisation, globally has the same composition as the molten liquid bath before solidification.

Embodiment 74

An electrode comprising the crystalline electrode material according to any of embodiments 30 to 40 and 67 to 72.

Embodiment 75

A battery comprising a cathode, an anode and an electrolyte, where the cathode comprises the electrode according to embodiment 74.

Embodiment 76

An apparatus for preparing a crystalline lithium-containing electrode material, comprising
 a chamber for holding a liquid bath comprising the electrode material in a melted state, said electrode material comprising lithium, a metal and phosphate;
 a heater for maintaining the electrode material within the liquid bath in said melted state;
 a feeding device configured for feeding a precursor of the electrode material into the liquid bath; and
 a solidification zone in communication with said chamber for inducing solidification of a portion of the liquid bath introduced into the solidification zone so as to obtain a solidified electrode material.

Embodiment 77

An apparatus according to embodiment 76, wherein said feeding device is configured for heating the precursor of the electrode material contained within the feeding device under a controlled atmosphere.

Embodiment 78

An apparatus according to embodiment 76 or 77, wherein said chamber is configured to provide assisted convection.

Embodiment 79

An apparatus according to any one of embodiments 76 to 78, wherein said solidification zone comprises a cooling surface, a mold or an atomization zone.

Embodiment 80

A reactor according to any one of embodiments 76 to 78, further comprising a pulverizer for grinding the solidified electrode material so as to obtain particles thereof.

Embodiment 81

An apparatus according to embodiment 80, further comprising a processing zone for depositing, by heating an organic carbon source, a carbon coating on the particles of the lithium-containing electrode material.

Embodiment 82

An apparatus according to any one of embodiments 76 to 81, wherein said feeding device is configured to feed the precursor in the chamber while liquid from the chamber is being transferred to the solidification zone.

Embodiment 83

An apparatus according to any one of embodiments 76 to 81, wherein the feeding device is configured to feed the precursor in the chamber at a rate which matches a rate of transfer of liquid from the chamber to the solidification zone so as to maintain the liquid in the chamber at a generally constant level.

Note that titles or subtitles may be present throughout the present specification for convenience of a reader, which in no way should limit the scope of the invention. Moreover, certain theories are proposed and disclosed herein; however, in no way they, whether they are right or wrong, should limit the scope of the invention so long as the invention is practiced according to the present disclosure without regard for any particular theory or scheme of action.

The expression "nominal formula" is used herein to mean that the stoichiometry of the solidified material to which this expression refers can vary by a few percents from stoichiometry due to substitution or other defects present in the material's structure. An example of such substitution or other defects includes anti-sites structural defects such as, without any limitation, cation disorder between iron and lithium in a $LiFePO_4$ crystal. See, for example Maier et al. [Defect Chemistry of $LiFePO_4$, Journal of the Electrochemical Society, 155, 4, A339-A344, 2008] and Nazar et al. [Proof of Supervalent Doping in Olivine $LiFePO_4$, Chemistry of Materials, 2008, 20 (20), 6313-6315]. One can also refer to 'Elementary Thermodynamics for Geologists' by B. J. Wood, Oxford University Press, 1977 to appreciate the generality of the phenomena.

As sued herein, the expression "olivine" refers to a structure having the major XRD characteristics of the substantially pure crystalline $LiFePO_4$ or $LiMnPO_4$ compounds, including metal ion or anion substitution, anti-site defects, vacancies, interstitial ions in the olivine structure as well as element occlusions that can be present and nanodispersed in the crystal.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps. It will also be understood by those of skill in the art that the transitional phrase "consisting essentially of" limits the scope of a claim to the specified materials or steps and those that do not materially affect the basic and novel characteristic(s) of the claimed invention.

Although the present invention has been described in considerable detail with reference to certain embodiments thereof, variations and refinements are possible without departing from the invention. While the compositions and methods of this invention have been described in terms of preferred embodiments, it is apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

All references cited throughout the specification are hereby incorporated herein by reference in their entirety.

The invention claimed is:

1. A process for preparing a crystalline electrode material, the process comprising:
 providing a liquid bath comprising the electrode material in a melted state; and
 introducing a precursor of the electrode material into the liquid bath, wherein the electrode material comprises lithium, a metal and phosphate,
 the process being performed in a continuous or semi-continuous manner.

2. The process according to claim 1, further comprising withdrawing a portion of the liquid bath and inducing solidification of the portion so as to obtain a solidified electrode material.

3. The process according to claim 2, further comprising removing an impurity-containing portion from the solidified electrode material.

4. The process according to claim 2, wherein said inducing solidification step comprises a cooling step, a casting step or an atomization step.

5. The process according to claim 2, further comprising a pulverization step of the solidified electrode material so as to obtain particles of said solidified electrode material.

6. The process according to claim 1, wherein the liquid bath is maintained at a temperature between the melting temperature of the electrode material and about 300° C. above the melting temperature so as to maintain the electrode material in said melted state.

7. The process according to claim 6, wherein assisted convection is performed while maintaining the liquid bath at said temperature.

8. The process according to claim 5, further comprising adding an organic source of carbon prior to, concomitant with, or after said pulverization step, and heating to obtain a carbon coating on at least part of the surface of the electrode material particles.

9. The process according to claim 1, wherein said liquid bath comprises a first liquid and a second liquid, or a gas, or a solid, wherein said first liquid comprises said electrode material in the melted state and said first liquid is in thermodynamic equilibrium with said second liquid, or gas, or solid.

10. The process according to claim 9, wherein said second liquid comprises Cu—Sn, Sn, or a Sn alloy.

11. The process according to claim 1, wherein said precursor comprises a natural occurring source compound for the metal.

12. The process according to claim 11, wherein the metal is iron or manganese and said natural occurring source is an oxide containing magnetite or hematite.

13. The process according to claim 1, wherein the liquid bath is held in an enclosure, wherein at least a portion of the enclosure is made of graphite or graphite-silicon, alumina or zirconia.

14. The process according to claim 2, wherein the precursor is introduced into the liquid bath at a rate which matches a rate of liquid withdrawing so as to maintain the liquid in the liquid bath at a generally constant level.

15. A crystalline electrode material prepared by the process of claim 1, having an olivine structure, the material comprising lithium substituted by less than 0.1 atomic ratio relative to lithium of Na or K; a metal selected from Fe, Mn, and a mixture thereof, substituted by less than 0.1 atomic ratio relative to the metal of an atom selected from the group consisting of: (a) Mg, Ca, Al and B, (b) Nb, Zr, Mo, V and Cr, (c) Fe (III), and (d) any combinations thereof; and $PO_4$, substituted by less than 20% atomic weight of a non-metal oxyanion selected from $SO_4$, $SiO_4$, $BO_4$, $P_2O_7$, and any combinations thereof, wherein the material is in the form of particles, the particles having on at least a portion of the surface thereof a non-carbon and non-olivine phase.

16. The crystalline electrode material according to claim 15, wherein the non-carbon and non-olivine phase is present at less than 15 wt. %, or less than 10 wt. %, or less than 5 wt. %-relative to the weight of the electrode material.

17. The crystalline electrode material according to claim 15, said non-carbon and non-olivine phase comprising Si, Al, Zr or a combination thereof at a concentration of less than 5 wt. % relative to the weight of the electrode material and more than 500 ppm.

18. The crystalline electrode material according to claim 15, further comprising a non-powdery adherent carbon coating on at least a portion of the surface of said particles, said coating being present at less than 15 wt. % by weight, or less than 10 wt. %, or less than 5 wt. % relative to the weight of the electrode material.

19. The crystalline electrode material according to claim 15, wherein the electrode material comprises individual particles and agglomerates thereof, where the size of the individual particles is between about 10 nm and about 3 µm, and the size of agglomerates is between about 100 nm and about 30 µm.

20. The crystalline electrode material according to claim 15, wherein the material has a nominal formula Li($Fe_{1-x}Mn_x$) $PO_4$, wherein $0 \le x \le 1$.

* * * * *